(12) United States Patent
Kalinsky et al.

(10) Patent No.: US 8,657,093 B1
(45) Date of Patent: Feb. 25, 2014

(54) DRY APPLICATION CLUTCH ARRANGEMENT

(75) Inventors: Robert M. Kalinsky, Broadview Heights, OH (US); Scott W. Stevens, Columbia Station, OH (US); Stefan Vinca, Westlake, OH (US)

(73) Assignee: Logan Clutch Corporation, Westlake, OH (US)

( * ) Notice: Subject to any disclaimer, the term of this patent is extended or adjusted under 35 U.S.C. 154(b) by 295 days.

(21) Appl. No.: 13/135,001

(22) Filed: Jun. 22, 2011

Related U.S. Application Data

(60) Provisional application No. 61/398,303, filed on Jun. 23, 2010.

(51) Int. Cl.
*F16D 13/52* (2006.01)
*F16D 69/02* (2006.01)

(52) U.S. Cl.
USPC ................ 192/70.14; 192/107 R; 192/107 M

(58) Field of Classification Search
USPC ............................................ 192/70.14, 85.49
See application file for complete search history.

(56) References Cited

U.S. PATENT DOCUMENTS

| | | | | |
|---|---|---|---|---|
| 1,700,860 | A * | 2/1929 | Snell | 192/70.14 |
| 3,982,611 | A * | 9/1976 | Gannon | 192/70.14 |
| 4,563,386 | A * | 1/1986 | Schwartz | 192/107 M |
| 4,656,203 | A * | 4/1987 | Parker | 192/107 M |
| 4,663,368 | A * | 5/1987 | Harding et al. | 192/107 M |
| 4,775,705 | A * | 10/1988 | Parker et al. | 192/107 M |
| 5,029,686 | A * | 7/1991 | Yesnik | 192/70.14 |
| 5,083,650 | A * | 1/1992 | Seiz et al. | 192/107 M |
| 6,877,595 | B2 * | 4/2005 | Neumann et al. | 192/107 R |
| 7,225,909 | B1 * | 6/2007 | Kalinsky et al. | 192/85.49 |
| 2011/0162919 | A1 * | 7/2011 | Kapanowski et al. | 188/73.1 |

* cited by examiner

*Primary Examiner* — Rodney Bonck
(74) *Attorney, Agent, or Firm* — Daniel D. Wasil; Ralph E. Jocke; Walker & Jocke

(57) ABSTRACT

A PTO clutch assembly is directed to marine environment usage with a propeller drive shaft. The PTO clutch assembly can be operated at 7 degrees of axial tilt. A clutch friction disc has a recessed area that reduces the need for initial break-in.

19 Claims, 19 Drawing Sheets

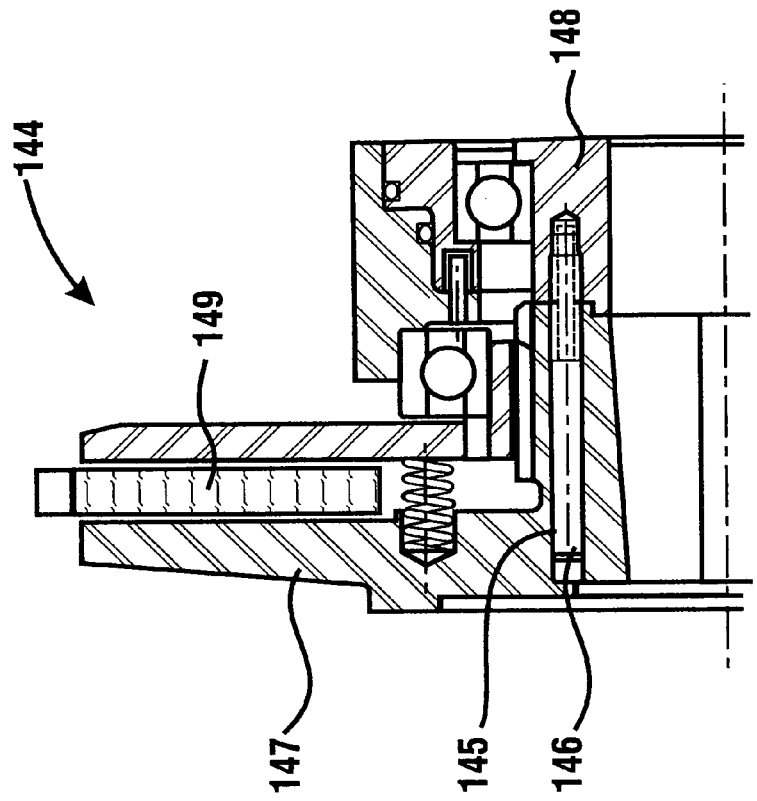
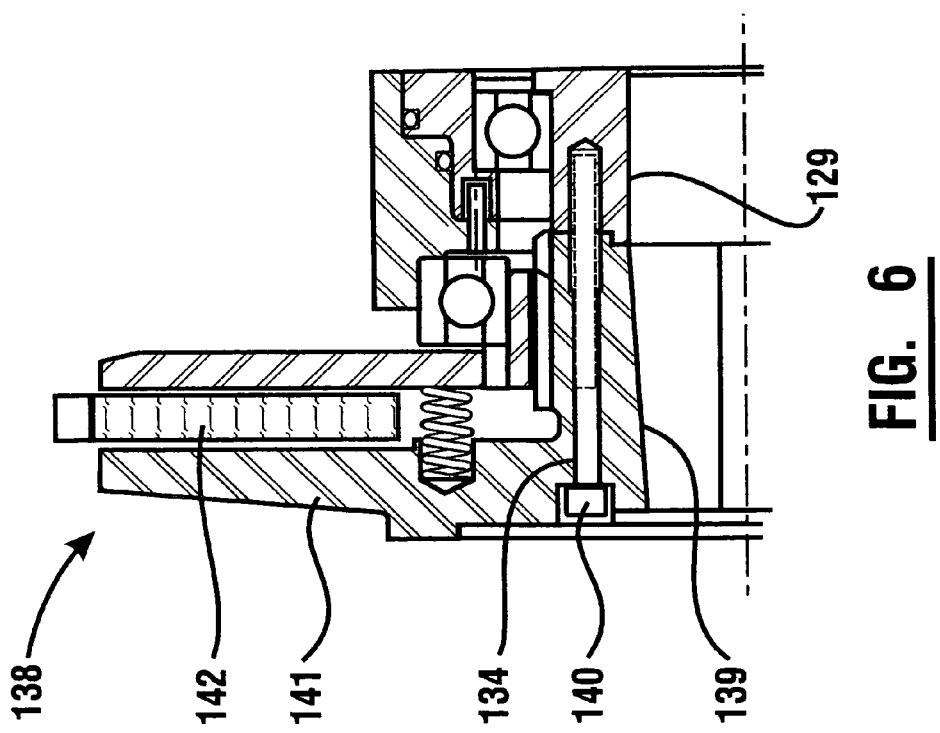
FIG. 6
FIG. 7

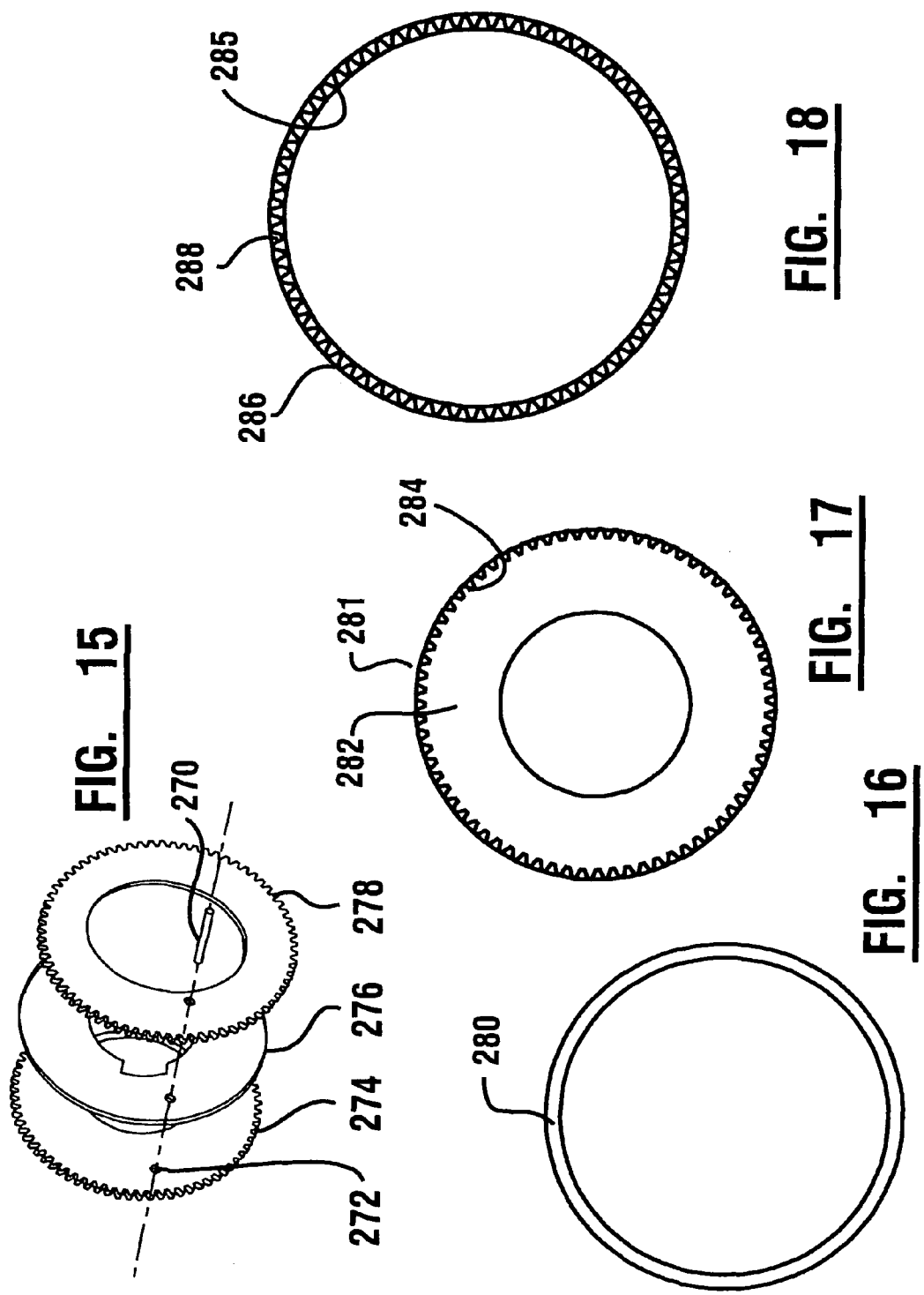

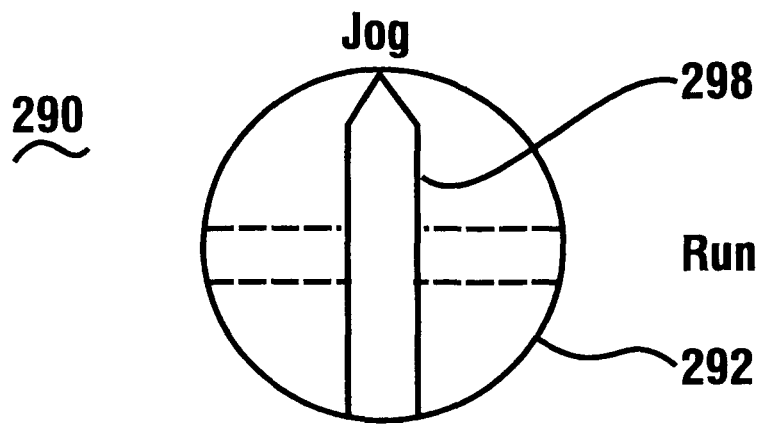
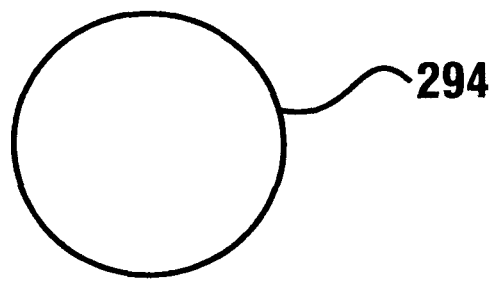
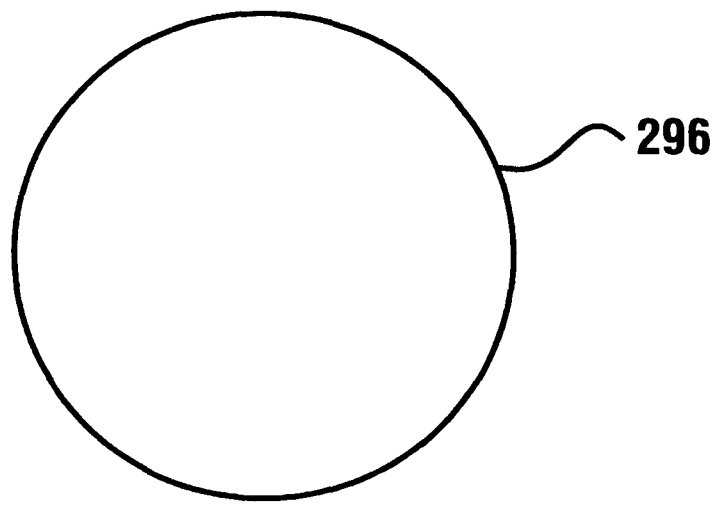
FIG. 19

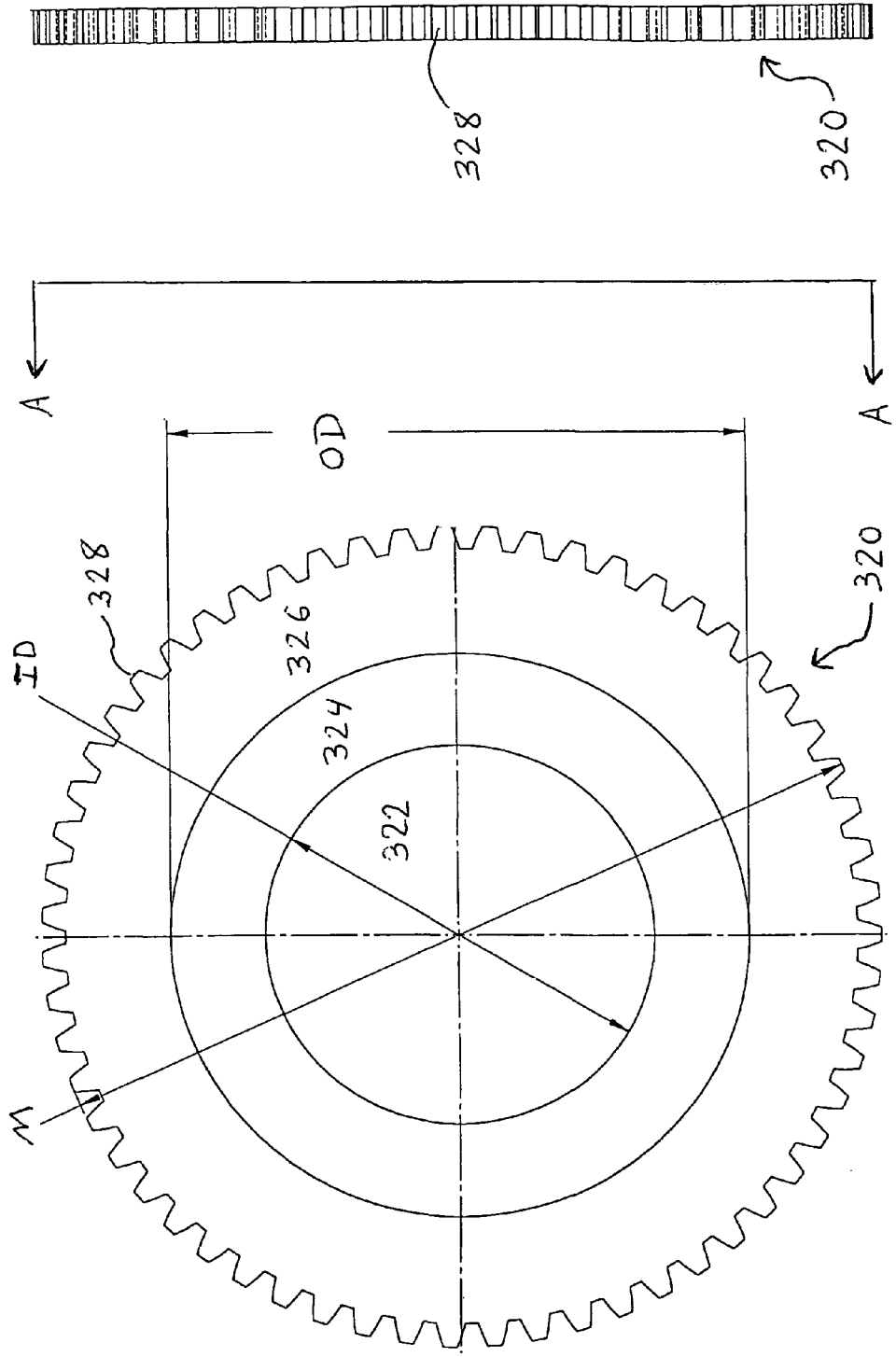

DRY APPLICATION CLUTCH ARRANGEMENT

CROSS REFERENCE TO RELATED APPLICATION

This application claims benefit pursuant to 35 U.S.C. §119 (e) of U.S. provisional application 61/398,303 filed Jun. 23, 2010, which is herein incorporated by reference.

TECHNICAL FIELD

This invention relates to clutches, particularly to air or fluid actuated PTO clutches.

BACKGROUND OF INVENTION

Power take off (PTO) clutches and their operation are well known in the art. A PTO clutch is typically arranged surrounding a shaft. A PTO clutch can be used to translate rotation from a drive source, such as an engine flywheel, to drive the shaft via mechanical actuation. As is well known, induced positive engagement of a friction disk can result in translation of flywheel rotation to the shaft. Other components such as tools can then be driven off of the rotating drive shaft.

There are several problems associated with the design and operation of the prior art PTO clutches. For example, mechanical linkages can have a complex arrangement of many parts.

Replacement of a particular part can require disassembly of the entire clutch and the handling of numerous non-defective parts. Thus, part replacement can be cumbersome and time consuming.

Thus, there exists a need for a PTO clutch apparatus without complex mechanical linkages and that provides for a simpler and more efficient part replacement process.

OBJECTS OF EXEMPLARY EMBODIMENTS

It is an object of an exemplary embodiment to provide a clutch apparatus and method.

It is an object of an exemplary embodiment to provide a clutch apparatus that is more readily repairable.

It is a further object of an exemplary embodiment to provide an air-actuated or fluid-actuated PTO clutch assembly which can replace an existing PTO clutch assembly of mechanical linkage.

It is a further object of an exemplary embodiment to provide a PTO clutch assembly that can be factory or field retrofitted to replace new or existing Twin Disc® Bell Housing style PTO clutches.

It is a further object of an exemplary embodiment to provide a clutch kit 10 comprising components of the novel PTO clutch assembly.

It is a further object of an exemplary embodiment to provide a method of replacing a PTO clutch assembly or components thereof.

It is a further object of an exemplary embodiment to provide a method of using the existing Bell Housing during retrofit of a Twin Disc® Bell Housing style PTO clutch.

It is a further object of an exemplary embodiment to provide a method of controlling clutch engagement based on machine operation.

Further objects of an exemplary embodiment will be made apparent from the following Description of Exemplary Embodiments.

The foregoing objects are accomplished in a preferred embodiment by an apparatus and method for an air-actuated or a fluid-actuated PTO clutch assembly.

In the exemplary embodiment the PTO clutch assembly is readily connected via a nut to a tapered shaft to permit drive thereof. The clutch assembly includes one or more friction discs positioned between a rotatable pressure plate and a rotatable friction plate. The shaft is mated with the friction plate to rotate therewith. A piston is pneumatically or fluidly pressure actuated to move the pressure plate against the rotating friction disc(s) to cause rotation of the friction plate. Thus, actuation of the piston results in impartation of drive to the shaft. The PTO clutch assembly allows for replacement of a mechanical linkage Bell Housing style PTO clutch assembly.

BRIEF DESCRIPTION OF DRAWINGS

FIG. 6 shows a screw arrangement in a clutch assembly portion.

FIG. 7 shows an alternative clutch assembly screw arrangement.

FIG. 15 shows a friction disc alignment arrangement.

FIG. 16 shows an anti-vibration liner.

FIG. 17 shows a liner adjacent friction disc teeth.

FIG. 18 shows a liner adjacent drive gear teeth.

FIG. 19 shows a machine control panel portion.

FIG. 21 shows a front view of an exemplary friction disc.

FIG. 22 shows a side view taken along section A-A of the exemplary friction disc of FIG. 21.

DESCRIPTION OF EXEMPLARY EMBODIMENTS

Figure 1:
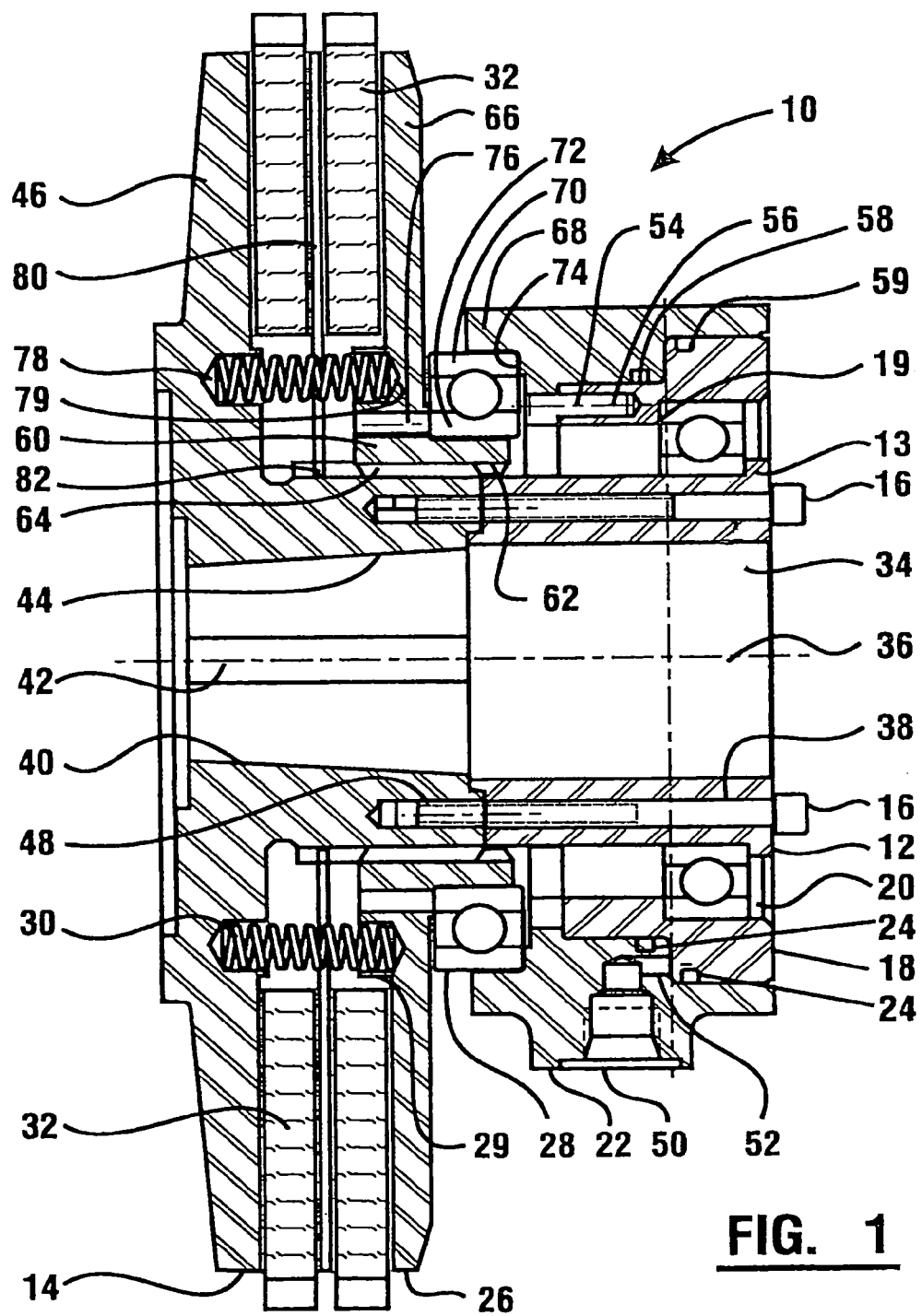
FIG. 1 is a cross-sectional view of a dual disc clutch assembly.

FIG. 1 shows an exemplary clutch apparatus. It should be understood that although the clutch apparatus components will be described herein with reference to a PTO clutch apparatus, it is within the scope of the present invention for the novel clutch components to also be applicable with other types of clutches. The clutch components shown in FIG. 1 are connectable to form at least a portion of a PTO clutch assembly 10.

The PTO clutch assembly 10 includes a hub 12, friction plate 14 (which may also be referred to herein as a backplate), connector members 16, housing 18, first bearing arrangement 20, piston assembly 22, 0-rings 24, pressure plate 26, second bearing arrangement 28, keeper 29, biasing members 30, and at least one friction disc 32. The clutch assembly 10 can be arranged about a shaft. The clutch assembly 10 can be operated to rotationally drive the shaft (i.e., a drive shaft).

The hub 12 is generally annular and includes a central bore passage 34 configured for arrangement in the assembly to receive and surround a drive shaft. The passage 34 includes a longitudinal axis 36. The hub is rotatable and includes holes, bores, or openings 38, each configured for arrangement in the assembly to receive a respective connector member 16. The friction plate 14 is rotatable and generally cylindrical. The friction plate 14 includes a central bore passage 40 configured for arrangement in the assembly to receive and surround the drive shaft. The passage 40 includes a longitudinal axis 42. In the exemplary clutch assembly 10 of FIG. 1 the passage 40 is tapered, with the circumferentially interior taper narrowing in a direction away from the hub 12. As discussed in more detail herein, the taper helps to hold the clutch assembly 10 onto the shaft. The tapered portion 40 of the friction plate 14 prevents movement of the clutch assembly 10 in a first axial direction relative to a correspondingly tapered segment of the drive shaft. The corresponding tapers can remain in fixed contact with each other during operation of the clutch assembly. The entire friction plate 14 can be radially supported on the tapered shaft segment.

The friction plate includes a base flange portion 44 and an arm portion 46. The flange portion 44 forms the passage 40. The arm portion 46 radially extends substantially perpendicular to the flange portion 44. The friction plate 14 also includes holes, bores, or openings 48, each configured for arrangement in the assembly to receive a respective connector member 16. In the exemplary clutch assembly 10, the friction plate 14 includes a plurality of shaft engaging portions capable of imparting rotation to the drive shaft. For example, the friction plate can have male/female portions (e.g., keys) that correspondingly engage with respective female/male portions (e.g., slots) of the drive shaft. In alternative embodiments both the hub and the friction plate (or only the hub) can be structured to engage the shaft for rotation therewith.

Each connector member 16 is sized to simultaneously extend in a hub opening 38 and friction plate opening 48 to connect the hub 12 to the friction plate 14. In the exemplary clutch assembly 10, the connector members comprise screws. During hub to friction plate connection, each threaded screw is engaged with the corresponding threads of aligned bores 38, 48.

In an exemplary arrangement, an annular radial gap remains between the hub bore 34 and the shaft. That is, the hub 12 remains spaced from the shaft during clutch engagement operation. The shaft may be without a step at its tapered and non-tapered shaft segments. Radial support for the hub 12 comes through its connection with the friction plate 14. The hub 12 can be supported by the friction plate 14 via the engagement between the tapered friction plate portion 40 and the tapered shaft segment. The entire clutch assembly 10 can be radially supported by the tapered segment of the shaft. Thus, the tapered shaft segment also supports the piston assembly 22. The housing 18 is generally cylindrical and is configured for arrangement in the assembly in generally surrounding relation about the hub 12.

The first bearing arrangement 20 comprises at least one bearing assembly. The first bearing arrangement 20 is configured for arrangement in the assembly between the hub 12 and the housing 18. The first bearing arrangement may also be referred to herein as a housing bearing arrangement, which comprises at least one housing bearing assembly. The housing bearing arrangement enables the hub to rotate relative to the housing. In the exemplary clutch assembly 10 the housing bearing arrangement comprises at least one ball bearing, with a plurality of bearing balls annularly positioned about the hub. In the exemplary clutch assembly 10, the housing bearing arrangement 20 is removably fixed between a hub flange 13 and a housing flange 19. The piston assembly 22 is generally cylindrical and configured for arrangement in the assembly adjacent the housing 18. The piston assembly 22 is arranged for sealing engagement with the housing. The piston assembly includes at least one air or fluid receiving port 50 in (air or fluid) communication with a respective air or fluid passage 52. In the exemplary clutch assembly 10 the piston assembly 22 is air or fluid actuated (or activated) to move axially relative to the housing 18 in sealed relation therewith. The piston assembly 22 can be driven by air and/or liquid, other gas or gases, or a combination of gases and fluids. The piston assembly 22 can operate as a hydraulic piston. The piston assembly 22 includes one or more guide pins 54 for guiding the piston assembly during movement thereof relative to the housing. Each guide pin 54 is slidable in a respective recess or bore 56 of the housing.

The 0-rings 24 are configured for arrangement in the assembly between the housing 18 and the piston assembly 22. The 0-rings 24 allow the piston assembly 22 to be in sealing engagement with the housing 18. The 0-rings are seated in respective circumferential slots or grooves in at least one of the housing and piston assembly. It should be understood that seal types other than 0-rings may also be applicable. In the exemplary clutch assembly 10 a piston seal 0-ring is sized for positioning in a piston groove 58 and a housing seal 0-ring is sized for positioning in a housing groove 59. Thus, the piston seal ring moves along with the piston assembly but the housing seal ring remains stationary with the housing. The air or fluid passage 52 is configured for discharging air or fluid between the 0-rings 24, 24. The increase in pressure between the 0-rings causes the piston assembly 22 to move in the axial direction toward the friction plate 14. Thus, the piston assembly 22 is operative to be pressure driven by air or fluid in an axial direction relative to the housing 18. The pressure plate 26 is generally cylindrical and is configured to be arranged in the assembly in mating slidable relationship with the flange portion 44 of the friction plate 14. The pressure plate 26 and the friction plate 14 are mated together (e.g., keyed, splined) to rotate together. The mated pressure plate is also able to move axially relative to the friction plate.

FIG. 1 shows the relationship of projections/slots 62 of a pressure plate base flange portion 60 mated with projections/slots 64 of the friction plate flange 44. The pressure plate includes an arm portion 66 radially extending substantially perpendicular to the flange portion 60. The arm portion 66 extends in a direction parallel to the friction plate arm portion 46. The spacing between the pressure plate and the friction plate is substantially the same along the length of a friction disc positioned therebetween. That is, the gap spacing is substantially the same along an elongated distance in the parallel direction (i.e., perpendicular to the longitudinal axis). As described in more detail herein, the pressure plate can be axially moved responsive to activation of the piston assembly.

The second bearing arrangement 28 comprises at least one bearing assembly. The second 15 bearing arrangement 28 is configured for arrangement in the assembly between the piston assembly 22 and the pressure plate 26. The second bearing arrangement may also be referred to herein as a piston bearing arrangement, which comprises at least one piston bearing assembly. The piston bearing arrangement 28 enables the pressure plate 26 to rotate relative to the piston assembly 22. In the exemplary clutch assembly 10 the piston bearing arrangement comprises at least one thrust bearing, with a plurality of bearing balls annularly positioned about the flange portion 60 of the pressure plate 26. In the exemplary clutch assembly 10, the piston bearing arrangement 28 is removably fixed in the radial direction between a piston flange 68 and the pressure plate flange 60. The piston bearing arrangement 28 includes a radially outer portion 70 and a radially inner portion 72. The outer portion 70 can abut an annular lip 74 of the piston assembly 22 for movement therewith during piston assembly activation. The inner portion 72 can be engaged to the pressure plate 26 for rotation therewith via a bearing guide pin 76. The piston bearing arrangement 28 can be arranged in the assembly 10 with axially play between the piston assembly 22 and the pressure plate 26. Alternatively, the piston bearing arrangement can be arranged in the assembly with constant contact with both the piston assembly and the pressure plate. Nevertheless, pneumatic or fluid activation of the piston assembly 22 is operative to cause the piston bearing arrangement 28 and the pressure plate 26 to be axially moved toward the friction plate 14.

The biasing members 30 are each configured for arrangement in the assembly between the pressure plate 26 and the friction plate 14. The biasing members 30 are operative to provide a biasing force against the pressure plate relative to the friction plate. In the exemplary clutch assembly 10 each biasing member comprises a compression spring. Each spring 30 is positioned in a state of compression between and in engagement with both the pressure plate and the friction plate. Thus, each spring 30 is operative to impart a pushing force against the pressure plate in a direction away from the friction plate. As shown in FIG. 1, a friction plate spring seat or aperture 78 and a pressure plate spring seat or aperture 79 can receive respective ends of a compression spring 30. A flange keeper 29 can provide radial support to the spring and maintain the spring ends in the seats 78, 79. The springs are configured so that the pushing force generated is large enough to move the pressure plate in a direction away from the friction plate when the piston assembly is not in an activated condition. The springs are also configured so that the generated pushing force is smaller than the air or fluid force generated to drive the piston assembly. Thus, the springs 30 are configured for operative association relative to the piston assembly configuration, including the diameters of the air or fluid receiving port 50 and the air or fluid passage 52. That is, the size and force of the applicable spring can be dependent on the piston assembly, and vice versa. In the exemplary clutch assembly 10 the length of the spring is greater than the engaged thickness of the friction discs.

Figure 2:
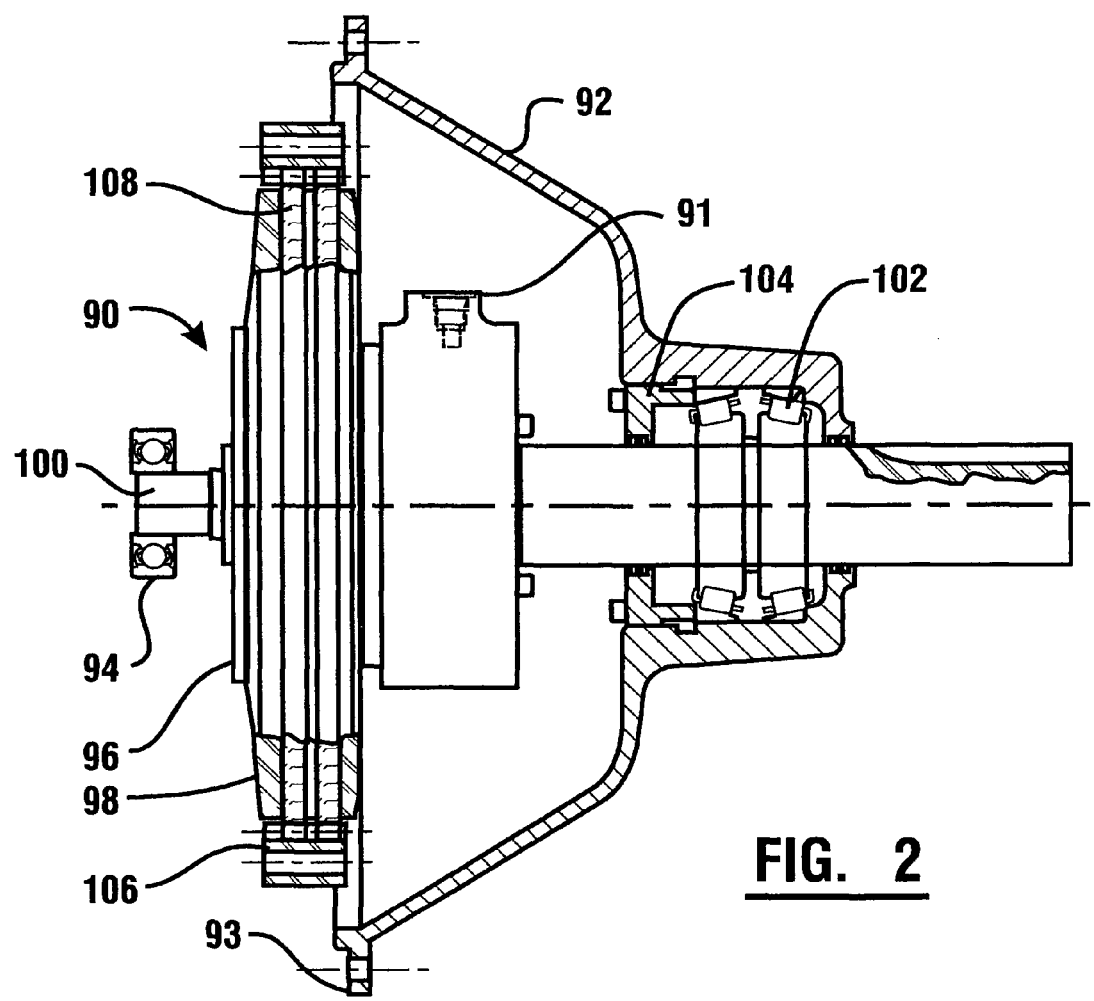
FIG. 2 is a schematic view of a dual disc clutch assembly installed in a Bell Housing.

The at least one friction disc 32 is configured to be arranged in the assembly between the pressure plate 26 and the friction plate 14. The exemplary clutch assembly 10 comprises two friction discs 32, 32. It should be understood that more or fewer friction discs are possible depending on the application. For example, the use of two friction discs can result in greater torque provided to the drive shaft in comparison to the use of only one friction disc. The friction discs 32 are placed in the assembly so that one is operative to engage the pressure plate and the other is operative to engage the friction plate. The outer circumference of each friction disc is geared to correspond (e.g., a splined relationship) with a drive source (e.g., a splined ring associated with a flywheel). The friction discs 32 can comprise a composite material, including impregnated fiber and/or brass fines and/or powdered metal. A disc separator plate 80 is arranged between the discs 32 in mating slidable relationship with the friction plate flange 44. The disc separator is positioned about the axial flange 44 of the friction plate. The disc separator and friction plate are mated (e.g., keyed, splined) to rotate together. The mated disc separator 80 is also able to move axially relative to the friction plate 14. FIG. 1 shows a projection 82 linking or mating the disc separator 80 to the friction plate flange 44. The friction plate projections 64 can be used in mating with the disc separator projections 82. The disc separator 80 can be cylindrically shaped with openings therein to permit passage of the springs 30 therethrough. As described in more detail herein, the mated disc separator 80 can be axially slid relative to the friction plate 14 responsive to activation of the piston assembly 22. FIG. 2 shows an exemplary double disc PTO clutch assembly 90 installed in a Bell Housing 92. The operation and components of the clutch assembly 90 are similar to those previously discussed with regard to the clutch assembly 10 of FIG. 1. For example, the clutch assembly 90 includes an air or fluid inlet port 91. The Bell Housing may comprise a Twin Disc® Bell Housing style for a PTO clutch. The Bell Housing 92 includes an annular mounting flange 93.

A shaft bearing arrangement 94 is engaged to an end of a drive shaft 100 to provide axially alignment or centering of the shaft. The shaft bearing arrangement 94 can be positioned in a supporting device, such as a flywheel. The shaft bearing arrangement 94 also provides rotational stability to the drive shaft. The bearings prevent the drive shaft 100 from rotating with a flywheel. A shaft nut arrangement 96, which may also include a washer, holds the friction plate 98 and the clutch assembly 90 onto the drive shaft 100. As previously discussed, the tapered passage (e.g., passage 40 of a friction plate 98) prevents movement of the clutch assembly 90 in a first axial direction relative to a correspondingly tapered shaft 100. The single nut 96 prevents movement of the clutch assembly 90 in the opposite axial direction relative to the shaft 100. Thus, the clutch assembly 90 can be readily connected/disconnected to a tapered shaft using a single nut 96. The easy-on easy-off quick release arrangement facilitates the ability to quickly change the clutch assembly or components thereof. The secure connection caused by the nut arrangement 96 also prevents the springs 30 from keeping the friction plate 14 away from the friction discs 32 during actuation of the piston 22. That is, with the clutch assembly 90 securely fastened to the shaft 100, the friction plate 98 is prevented from moving axially.

The drive shaft can be positioned and supported in the Bell Housing by another bearing arrangement 102. In an exemplary embodiment the bearing arrangement 102 comprises Timken® bearings or deep groove ball bearings. The Timken® bearings 102 and the bearing arrangement support 104 are mounted in the Bell Housing 92. The bearings 102 are angled with respect to each other to prevent movement of the drive shaft 100 in both axial directions relative to the Bell Housing. Also shown is a drive gear ring 106 which may be attached to the flywheel. The ring 106 can have interior splines for mating engagement with the friction discs 108 which are likewise correspondingly circumferentially splined or geared.

Figure 3:
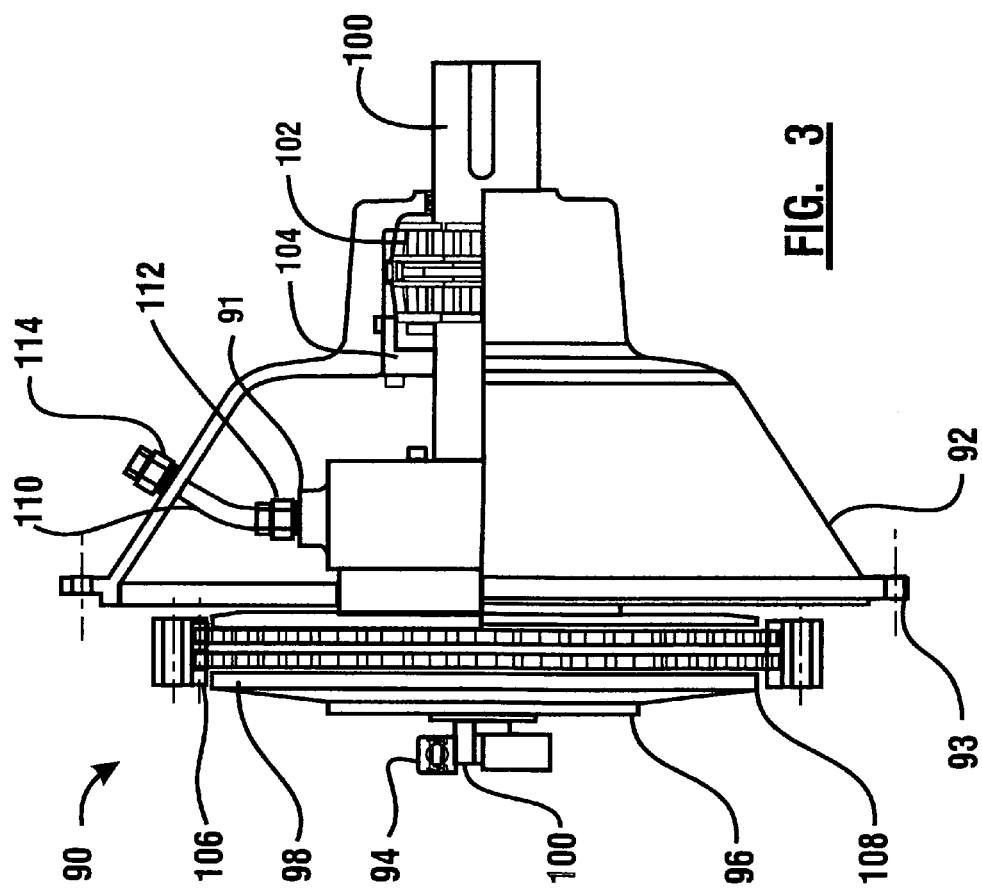
FIG. 3 is a partial cut away detailed view of the clutch assembly of FIG. 2.

FIG. 3 shows a partial cut away detailed view of the clutch assembly arrangement 90 of FIG. 2. Also shown is an air or fluid actuation line 110 fastened to the injection port 91 by a nut 112. The actuation line 110 may be flexible to permit bending with movement of the piston. The actuation line extends through the Bell Housing 92 and is fastened thereto by another nut 114.

Figure 4:
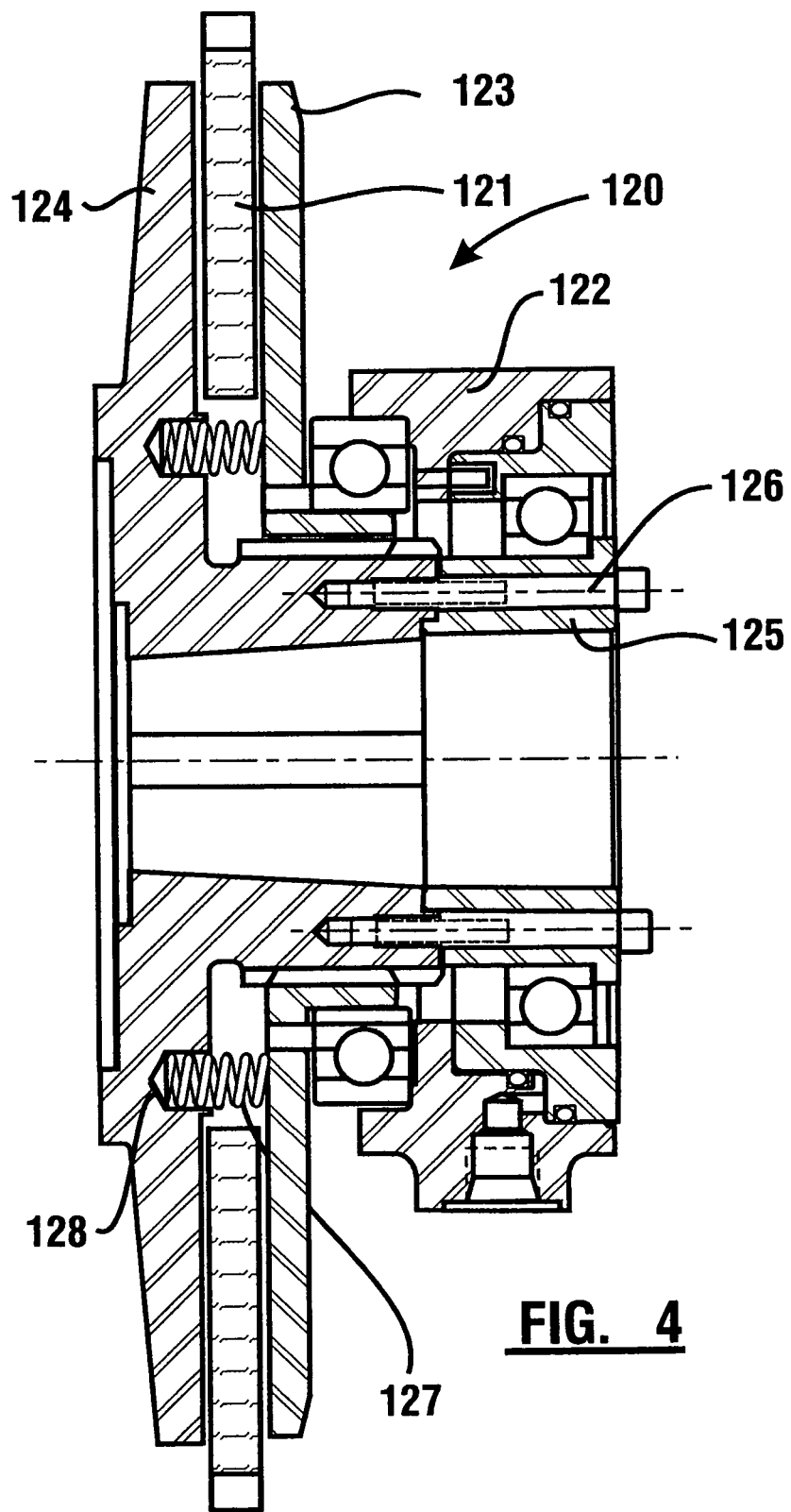
FIG. 4 is a cross-sectional view of a single disc clutch assembly.

In operation the piston assembly is axially driven toward the friction plate responsive to a predetermined pressure level be reached between the piston assembly and the housing due to the input of air or fluid into the air or fluid inlet port. Axial movement of the piston assembly acts to cause axial movement of the piston bearing arrangement. Axial movement of the piston bearing arrangement acts to cause axial movement of the pressure plate. Axial movement of the pressure plate acts to cause slipping abutment with the first (closest) rotating friction disc resulting in axial movement of the friction disc. Axial movement of the first friction disc acts to cause slipping abutment with the disc separator resulting in axial movement of the disc separator. Axial movement of the disc separator acts to cause axial movement of the second (furthest) rotating friction disc. Axial movement of the second friction disc acts to cause engagement with the friction plate. Thereafter, with no further axial movement permitted, the pressure plate, first friction disc, disc separator, second friction disc, and friction plate are positively frictionally engaged (e.g., compressed together) to rotate as a single unit. Thus, the clutch assembly, upon activation of the piston assembly, can translate rotation from the friction discs to a drive shaft extending along the longitudinal axis. FIG. 4 shows an exemplary PTO clutch assembly 120 comprising a single friction disc 121. The clutch assembly 120 operates in the same manner as the clutch assembly 10 of FIG. 1. The clutch assembly 120 has mostly the same clutch components as the clutch assembly 10, except for the single disc arrangement instead of the dual disc/disc separator arrangement. However, with use of a sole friction disc some of the components can be of a different (e.g., smaller) size. For example, the clutch assembly 120 can use an axially shorter piston assembly 122 because less travel distance is required to bring about positive (full) rotational translation to the drive shaft with only a single friction disc 121 between the pressure plate 123 and friction plate 124. Correspondingly, a shorter hub 125 and screws 126 can be used. Likewise, shorter compression springs 127 can be used because of the smaller axial gap between the pressure plate 123 and friction plate 124. Also, because of the shorter spring length, spring stability can be managed without both the friction plate and the pressure plate having aligned spring recesses. That is, a shorter spring 127 can be supported in only a single spring recess 128. The single recesses can all be in either the friction plate or the pressure plate, or in a combination of both plates.

Figure 5:
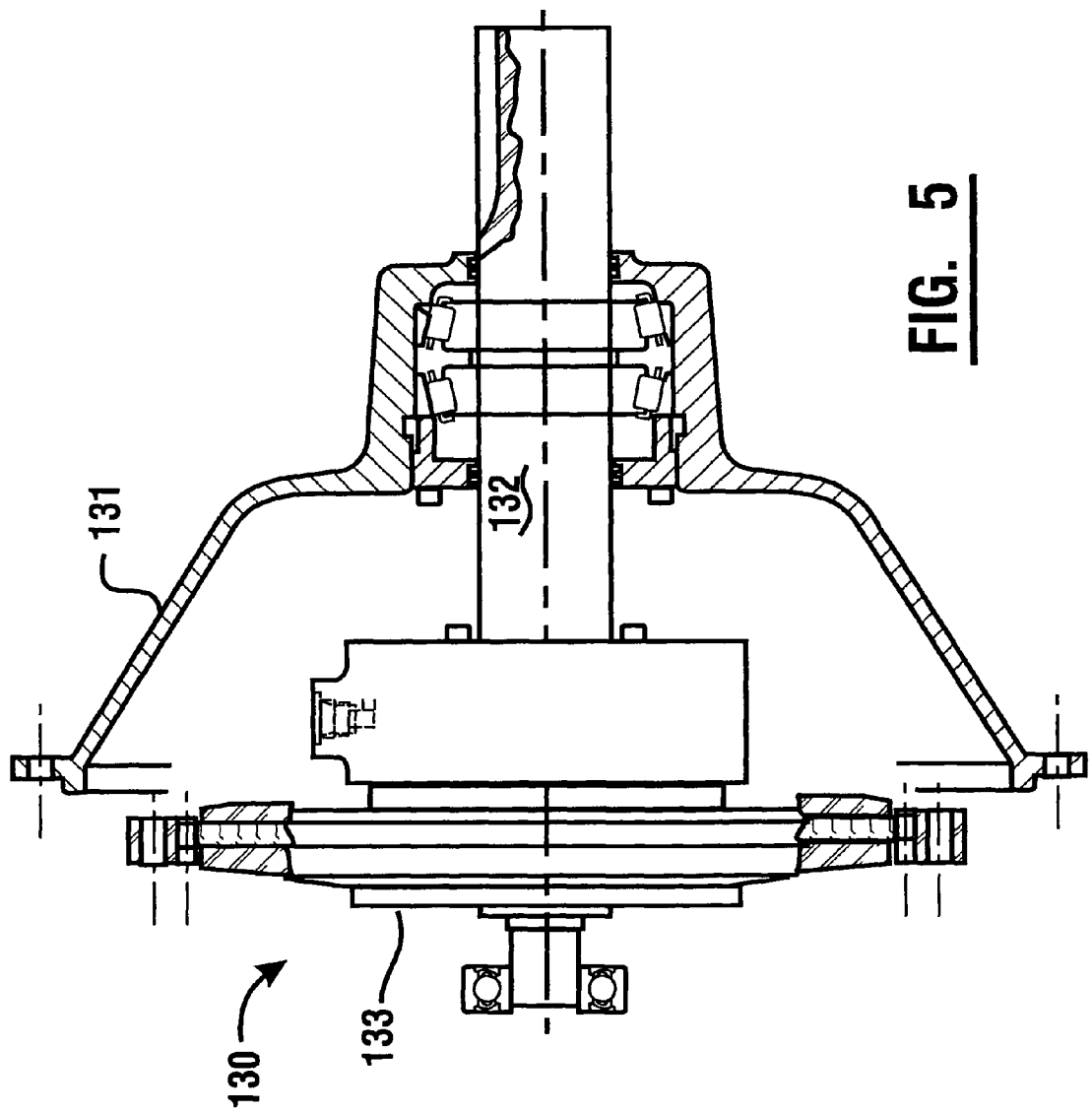
FIG. 5 is a schematic view of a single disc clutch assembly installed in a Bell Housing.

FIG. 5 shows an exemplary single disc PTO clutch assembly 130 installed in a Bell Housing 131. The clutch assembly 130 operates in the same manner as the clutch assembly 120 of FIG. 4. The drive shaft 132 and Bell Housing 131 can have the same configuration and be connected in the same manner as previously discussed with regard to FIG. 2. Again, a single nut 133 can hold the clutch assembly 130 onto the drive shaft 132.

In other exemplary clutch assembly arrangements the screws fastening the friction plate to the hub can be inserted and removed from the friction plate side instead of the hub side. A tap bore can extend through the friction plate to align with a bore extending partly into the hub. The shaft nut/washer can be arranged to cover the bore in the friction plate. Thus, in this screw arrangement the removal of the shaft nut would grant access to the friction plate screw(s).

Removal of the friction plate screws permits the friction disc (along with the friction plate and springs) to be removed without disturbing the other assembly components arranged on the shaft. Thus, the friction discs and springs can be readily and efficiently accessed and replaced.

FIGS. 6 and 7 show such exemplary arrangements of connector members 134, 146 (e.g., screws). For reasons of brevity only clutch assembly portions 138, 144 have been shown in FIGS. 6 and 7. The portions are taken from clutch assemblies having similar structure and operation to the clutch assembly of FIG. 4 except for the positioning of the screws that fasten the friction plate and hub to each other. The arrangement permits the screws to be inserted and removed from a bore extending through the friction plate. That is, the screw arrangement enables the screws to be accessed from the friction plate side of the clutch assembly, instead of the hub side. A friction disc can be replaced without removing the hub from the shaft.

FIG. 6 shows a clutch assembly portion 138 having a bore 139, screw 134 with a head flange 140, friction plate 141, hub 129, and friction disc 142.

FIG. 7 shows a clutch assembly portion 144 having a bore 145, screw 146, friction plate 147, hub 148, and friction disc 149. The screw 146 can be headless. It should be understood that the screw arrangements shown in FIGS. 6 and 7 are likewise applicable with a clutch assembly having plural friction discs, such as the clutch assembly of FIG. 1.

Figure 8:
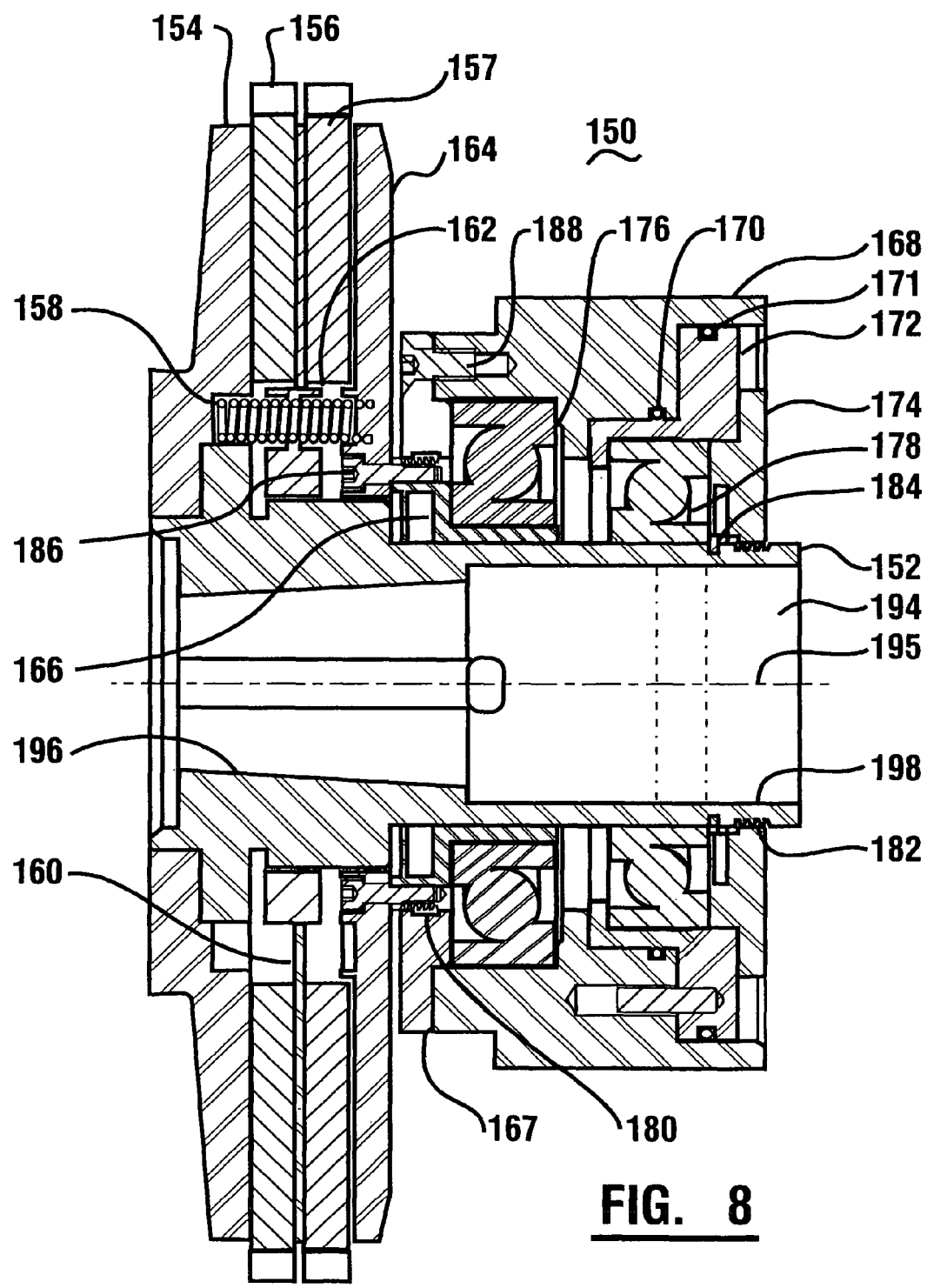
FIG. 8 shows a cross-sectional view taken along section A-A of FIG. 9.
Figure 9:
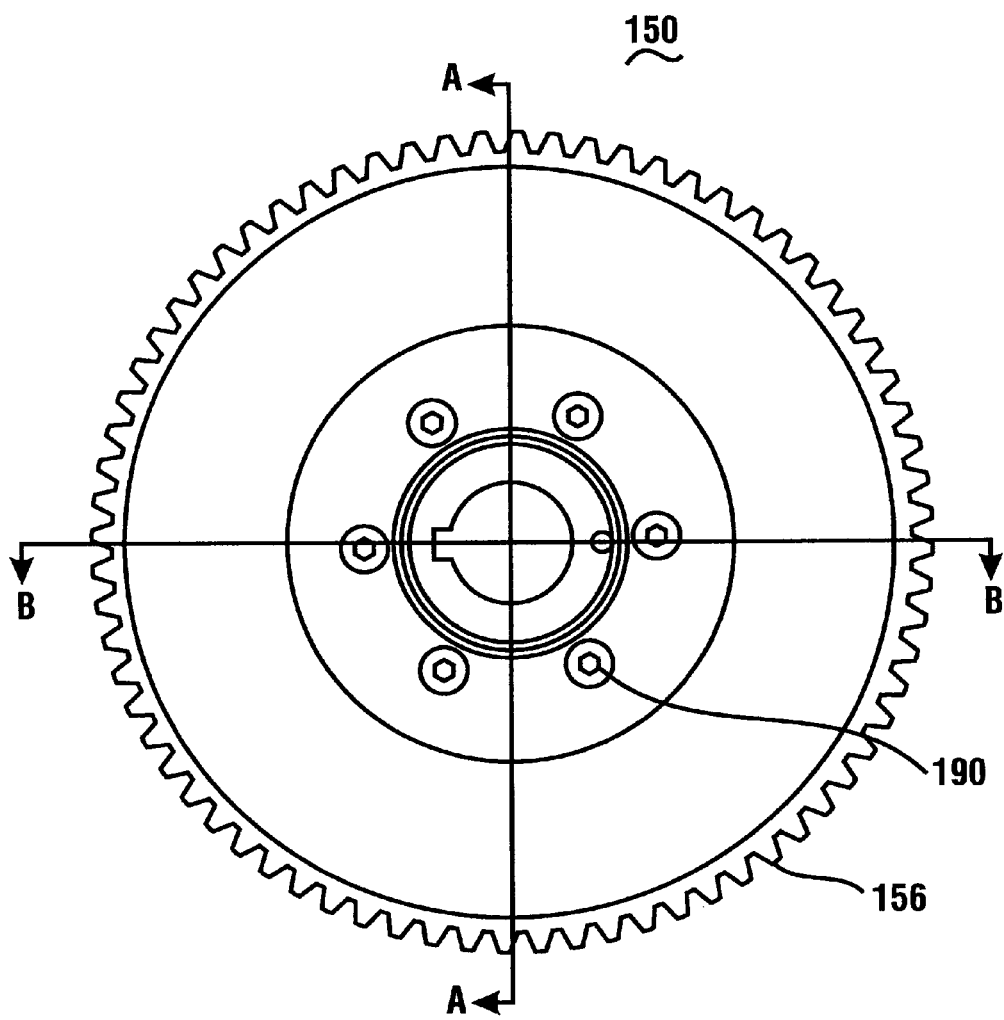
FIG. 9 shows an alternative dual disc clutch assembly.
Figure 10:
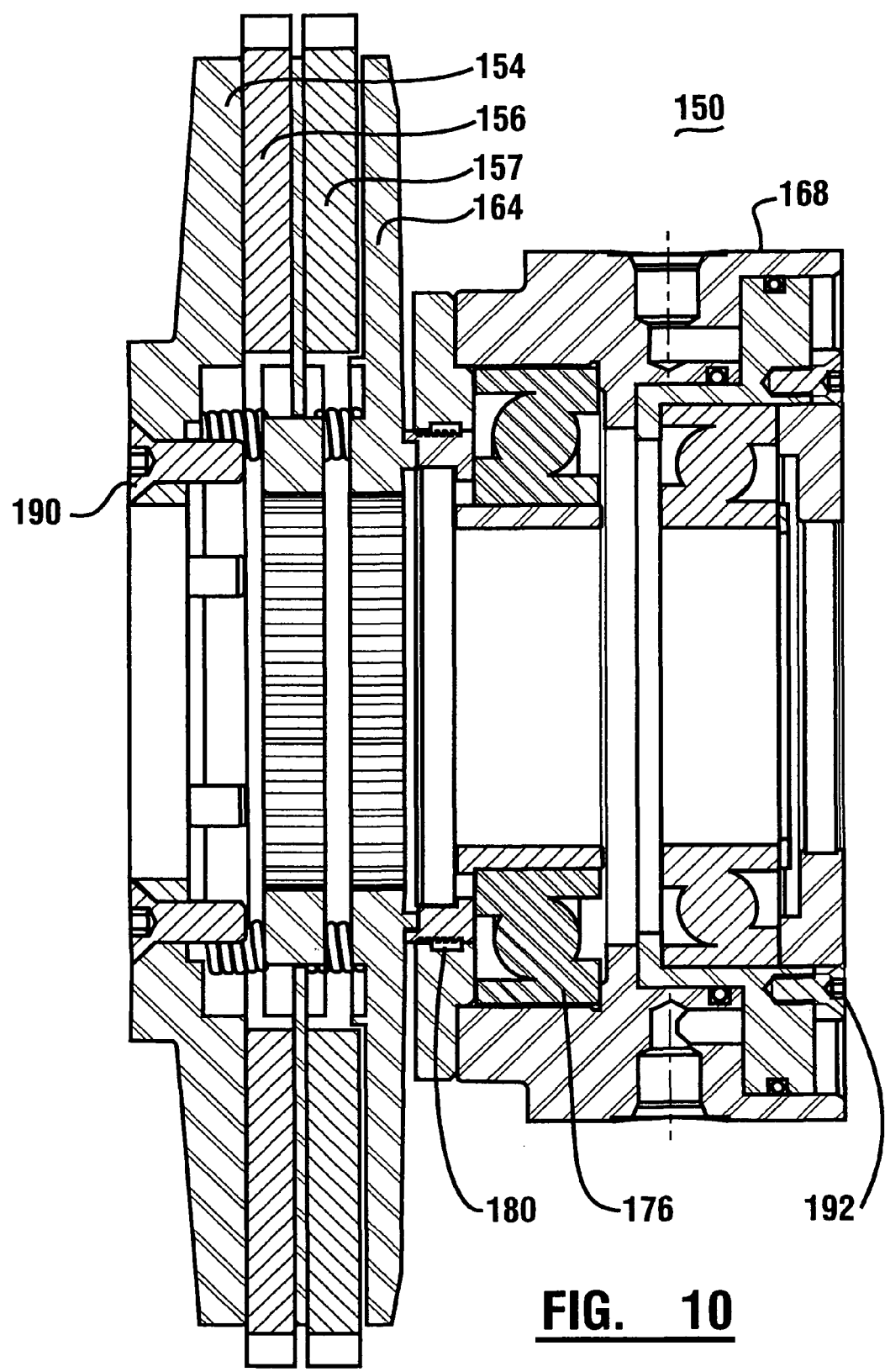
FIG. 10 shows a cross-sectional view taken along section B-B of FIG. 9.

FIGS. 8-10 show views of an alternative dual disc clutch assembly 150. FIG. 8 is a cross-sectional view taken along section A-A of FIG. 9. FIG. 9 shows a side view. FIG. 10 is a cross-sectional view taken along section B-B of FIG. 9.

The alternative clutch assembly 150 can likewise be used in a PTO operation with a Bell Housing. The clutch assembly components can operate in manners similar to previously discussed similar components. As previously discussed, an existing Bell Housing can be retrofit 15 with the PTO clutch assembly. Certain removed existing components (e.g., shaft) may be reused.

FIG. 8 shows particular components of the clutch assembly 150, including a hub 152, friction plate 154 (which may also be referred to herein as a backplate), friction discs 156, 157, compression spring 158, disc separator 160, disc separator projections 162, pressure plate 164, spacers 166, 167, piston assembly 168, 0-rings 170, 171, cylinder assembly 172, spacer 174, angular contact bearings 176, 178, labyrinth seals 180, 182, snap ring 184, and fasteners 186, 188.

FIG. 9 shows additional fasteners 190. FIG. 10 shows additional fasteners 192.

The general operations of labyrinth seals and angular contact bearings are known, and need not be discussed further. However, in the novel clutch assembly 150, the angular contact bearings 176, 178 enable high torque performance while the labyrinth seals 180, 182 assist in the reduction or elimination of heat. As shown in FIG. 8, the hub 152 includes a bore 194. The bore is configured to receive a shaft. The longitudinal axis of the shaft can align with the bore axis 195. The bore 194 includes a tapered portion 196 and a non-tapered portion 198. The shaft likewise can include a tapered segment and a non-tapered segment. In a manner previously discussed, the non-tapered bore portion 198 can remain radially spaced from the non-tapered shaft segment during clutch engagement. This spacing enables the hub 152 to be radially supported solely (via the tapered bore portion 196) by the tapered shaft segment. The hub 152 can support the entire clutch assembly 150. Thus, the entire clutch assembly 150 can be radially supported by the tapered shaft segment. It follows that the friction plate 154 and the piston assembly 168 can be likewise supported (via the hub 152) at the tapered shaft segment.

Operation of the clutch assembly 150 can be ascertained from FIG. 8. Activation (e.g., pneumatic or fluid) of the piston assembly 168 is operative to cause the pressure plate 164 to move axially toward the friction plate 154. The friction discs 156 can be driven by an engine via a drive gear ring (e.g., ring 106), such driving operation being well known. Engagement of the friction plate 154 and the pressure plate 164 with the respective friction discs 156, 157 imparts rotation to the clutch (and its hub 152). The hub 152 and the shaft are correspondingly radially connected with each other via male/female portions, keys/slots, or spines/grooves. Thus, rotation of the hub 152 imparts rotation to the shaft. As is well known, shaft rotation can be used to drive one or more devices, such as a work tool.

In a manner previously discussed (e.g., nut arrangement 96), the clutch assembly 150 can be securely attached to the shaft by a nut arrangement. The nut arrangement prevents movement of the clutch assembly 150 relative to the shaft in a first axial direction. The corresponding hub taper and shaft taper engagement prevents movement of the clutch assembly 150 relative to the shaft in an opposite axial direction. Thus, the hub 152 can be radially and axially supported by the tapered shaft segment.

With the clutch assembly 150, the friction discs 156, 157 can be replaced without requiring removal of the nut arrangement. As seen in FIGS. 8 and 10, the friction plate 154 is connected to the hub 152 by fasteners 190. Removal of the fasteners 190 enables the friction plate 154 to be removed from the clutch assembly 150. Removal of the friction plate 154 permits direct access to the friction discs 156, 157. As further seen in FIGS. 8 and 10, at the disc end portion of the clutch assembly 150 the inner diameter of a friction disc 156 is greater than the outer diameter of the hub 152. Thus, the friction discs 156, 157 can be removed by axially moving them away from the hub 152 while the hub is still connected to the shaft. Thus, the clutch assembly 150 includes an easily removable friction plate 154 for quick access to the friction discs 156, 157.

Figure 11:
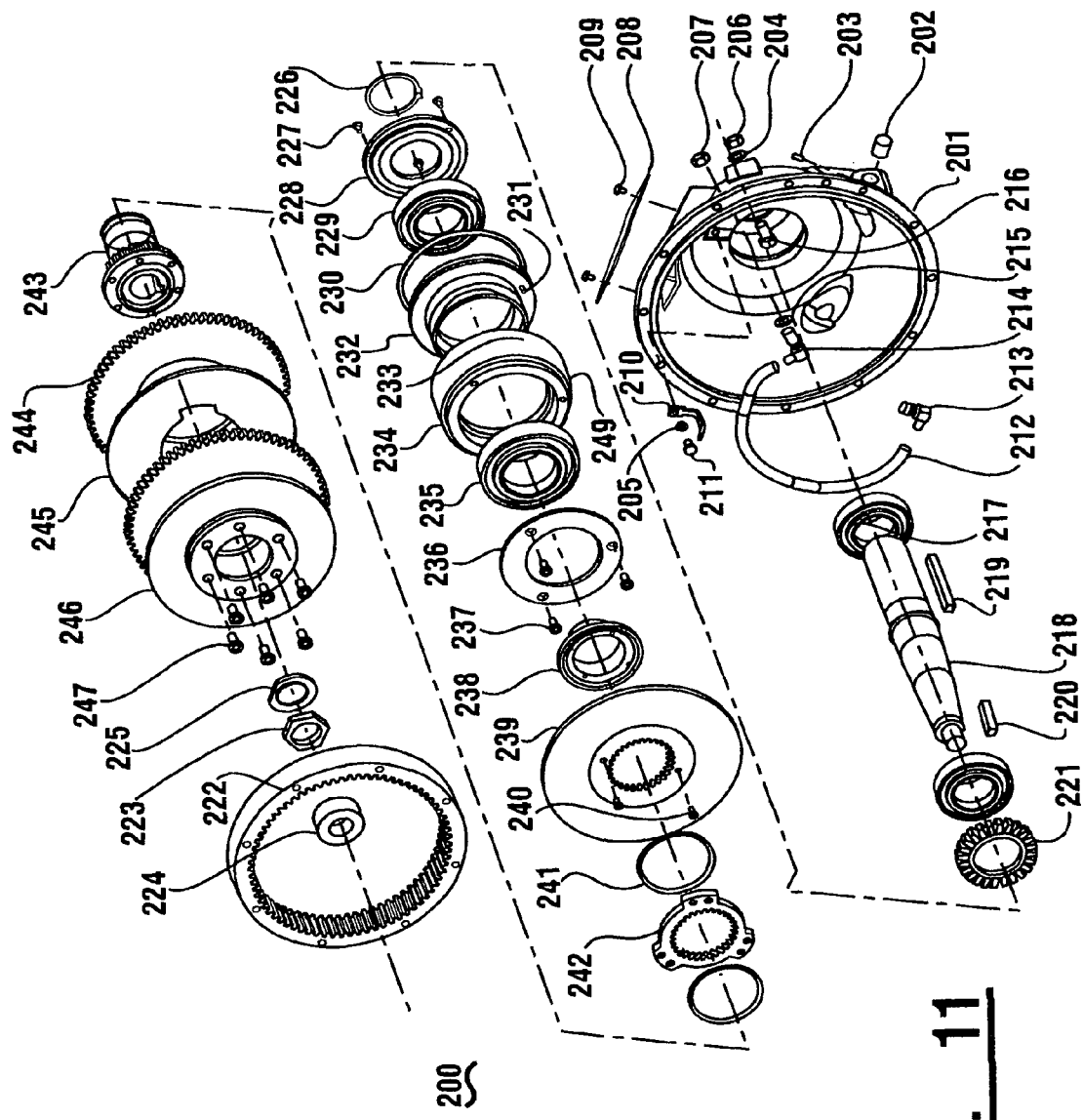
FIG. 11 shows an exploded view of components of an exemplary Bell Housing arrangement.

FIG. 11 shows an exploded view of components of an exemplary Bell Housing arrangement 200 that includes a further exemplary clutch assembly. The exemplary arrangement 200 includes a Bell housing 201, stopper plug 202, set screw 203, lock washers 204, 205, nuts 206, 207, name plate 208, pan head screw 209, anti-rotation bracket 210, hex bolt 211, hose assembly 212, swivel elbow 213, bulkhead fitting 214, washer 215, hex bolt 216, tapered roller bearing 217, shaft 218, shaft key 219, hub key 220, and bearing nut 221. The arrangement 200 further includes a drive ring 222, lock nut 223, shaft bearing 224, and lock washer 225. The arrangement 200 further includes a retaining ring 226, fasteners 227, spacer 228, angular contact bearing 229, O-ring 230, dowel pin 231, cylinder 232, O-ring 233, piston assembly 234, angular contact bearing 235, spacer 236, fastener 237, spacer 238, pressure plate 239, fastener 240, wave spring 241, separator 242, hub 243, (twin) friction discs 244, separator disc 245, backplate 246, and fasteners 247. A biasing member (e.g., spring) can be used to generate a separating force between the pressure plate 239 and the backplate 246 in a manner previously discussed. An exemplary clutch assembly can comprise components 226-247. The clutch assembly components 226-247 may be grouped or packaged together to form a clutch assembly kit.

The anti-rotation bracket 210 can prevent the piston assembly 234 from rotating. The anti-rotation bracket 210 can be attached to the housing 201. A portion of the bracket 210 can mate with a slot 249 in an outer circumferential edge of the piston assembly 234. In FIG. 11 the slot 249 can be seen at the bottom of the piston assembly 234.

The swivel elbow 213 enables the use of a rigid hose 212. In an exemplary hose assembly arrangement, one end of the hose 212 is fitted to the bulkhead 214 at a first (top) position. The other end of the hose 212 is fitted to the piston assembly 234 at a second (bottom) 20 position. The positioning and length of the hose 212 enable the piston 234 to move axially without bending or tangling the rigid hose.

Figure 12:
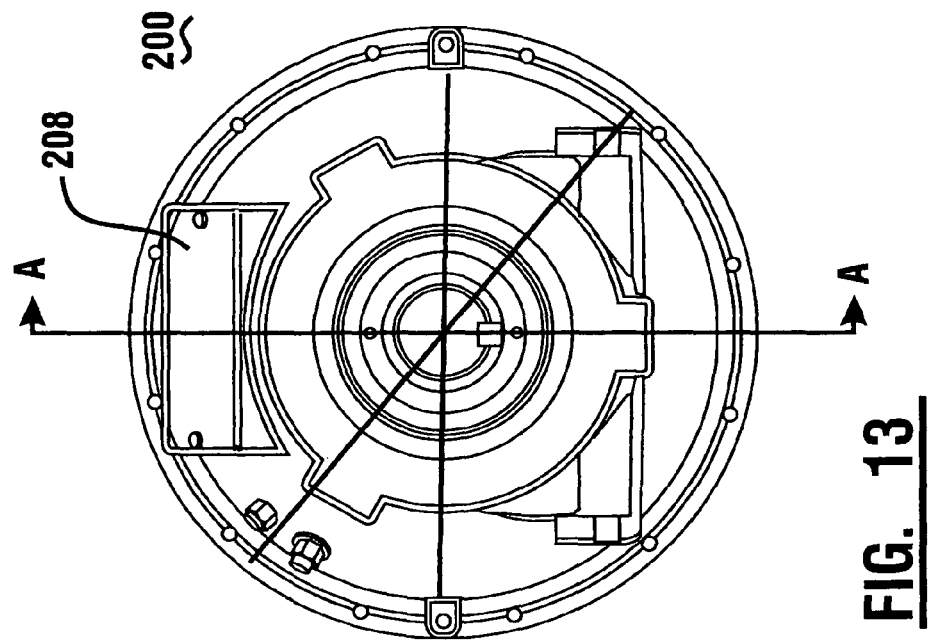
FIG. 12 shows the assembled components of FIG. 11.

FIG. 12 shows the assembled arrangement 200. For clarity, only a few of the components in FIG. 12 have been referenced, such as the housing 201, name plate 208, shaft 218, drive ring 222, piston assembly 234, and friction disc 244.

Figure 13:
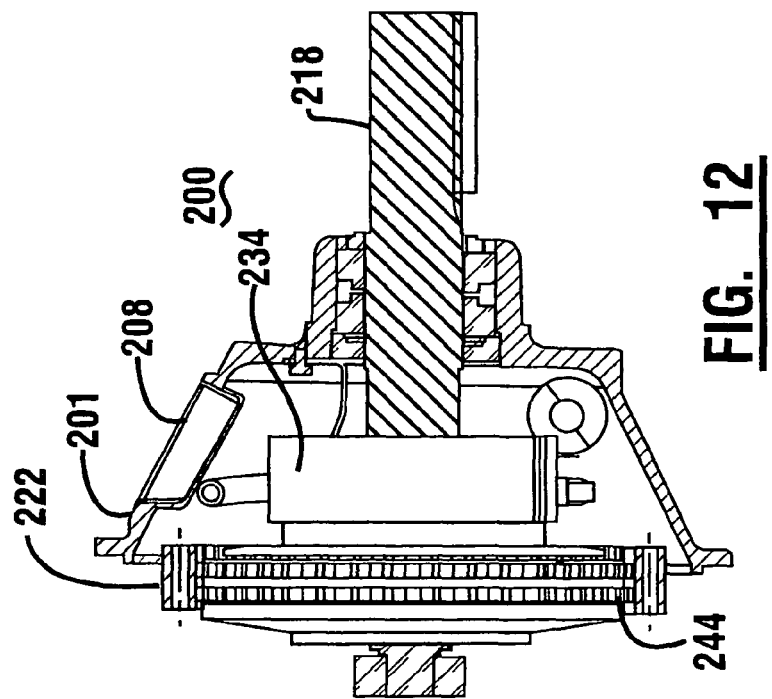
FIG. 13 shows a side view of the assembled arrangement of FIG. 12.

FIG. 13 shows a side view of the assembled arrangement 200. The name plate 208 on the housing 201 can be readily seen in FIG. 13. FIG. 12 is taken along A-A of FIG. 13.

Figure 14:
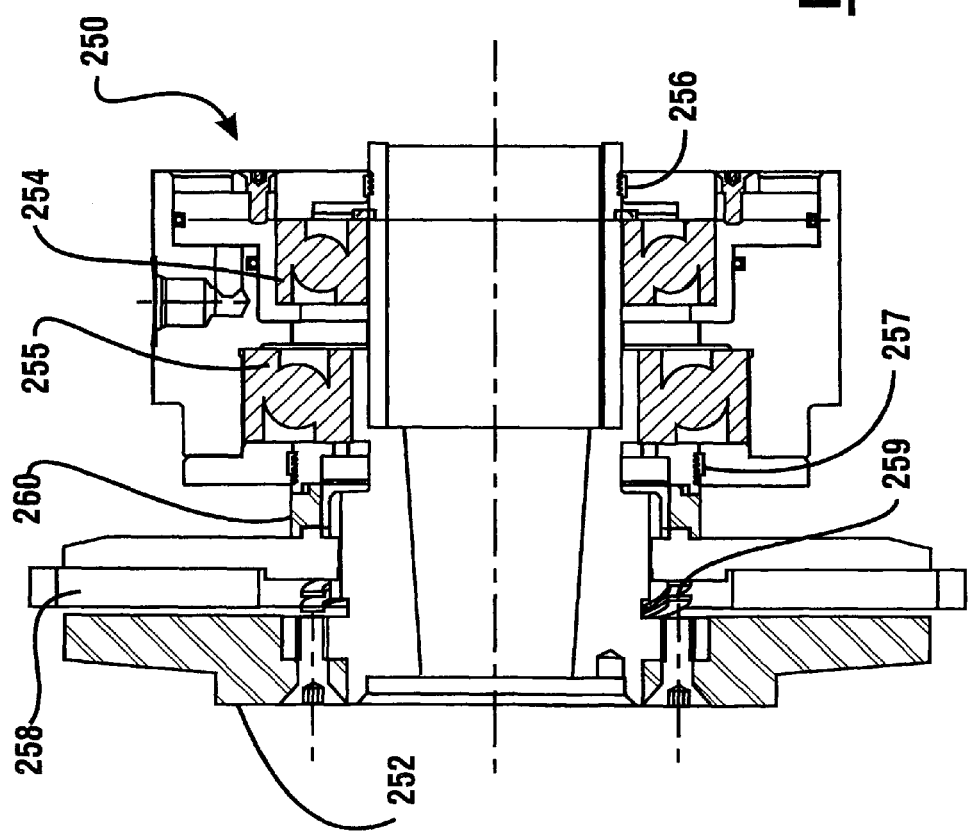
FIG. 14 shows an exemplary clutch assembly.

FIG. 14 shows another exemplary clutch assembly 250. The clutch assembly 250 is similar to the clutch assembly shown in the assembled arrangement 200. The clutch assembly 250 includes a removable backplate 252, angular contact bearings 254, 255, labyrinth seals 256, 257, and biasing member 259 (e.g., spring). However, instead of the previously discussed twin friction discs of the clutch assembly in assembled arrangement 200, the clutch assembly 250 has only a single friction disc 258. A spacer 260 is used to fill the axial void (distance) caused by a removed friction disc (and a separator disc). The spacer 260 can be chosen from among a plurality of spacers of various axial lengths to ensure spacing accuracy. The use of a spacer enables the same clutch assembly 250 to be used with one or more friction discs.

In a further exemplary clutch assembly installation process, friction discs can be aligned with each other prior to their installation about the shaft. The friction discs and the separator disc can each have one or more (axially extending) alignment holes therethrough. Each alignment hole is configured to receive an alignment pin therethrough. An alignment pin can extend through several aligned holes to maintain the friction discs in alignment during their installation.

The alignment pins may be removed after the drive ring has been properly installed. The holes may have a radial female slot through which a radial male key at an end of an alignment pin can—19—pass. After the key has passed through the holes, it can then be turned to provide engagement with the innermost side of a friction disc. FIG. 15 shows an alignment pin or rod 270 that can extend through aligned holes 272 in a first friction disc 274, a separator disc 276, and a second friction disc 278. An exemplary clutch assembly enables a reduction in torsional vibration. A drive gear ring (e.g., ring 106, 222) can be fitted with a resilient, flexible material adjacent the gear teeth. The resilient material can comprise a moldable liner that is placed intermediate the gear ring and the friction discs (e.g., 156, 157; 244). The liner can act as a vibration damper. The anti-vibration liner can be pliable so as to fill the gaps adjacent the gear teeth and the friction discs to reduce vibration. The resilient material may comprise a gel, paste, film, rubber, elastomeric, polymer, and/or plastic substance or material. The material can be applied to both the gear ring and the friction discs. The material may also comprise a hard slippery coating or composite which promotes slidability and/or reduces wear between the teeth. Turcite® material may be used.

Figure 20:
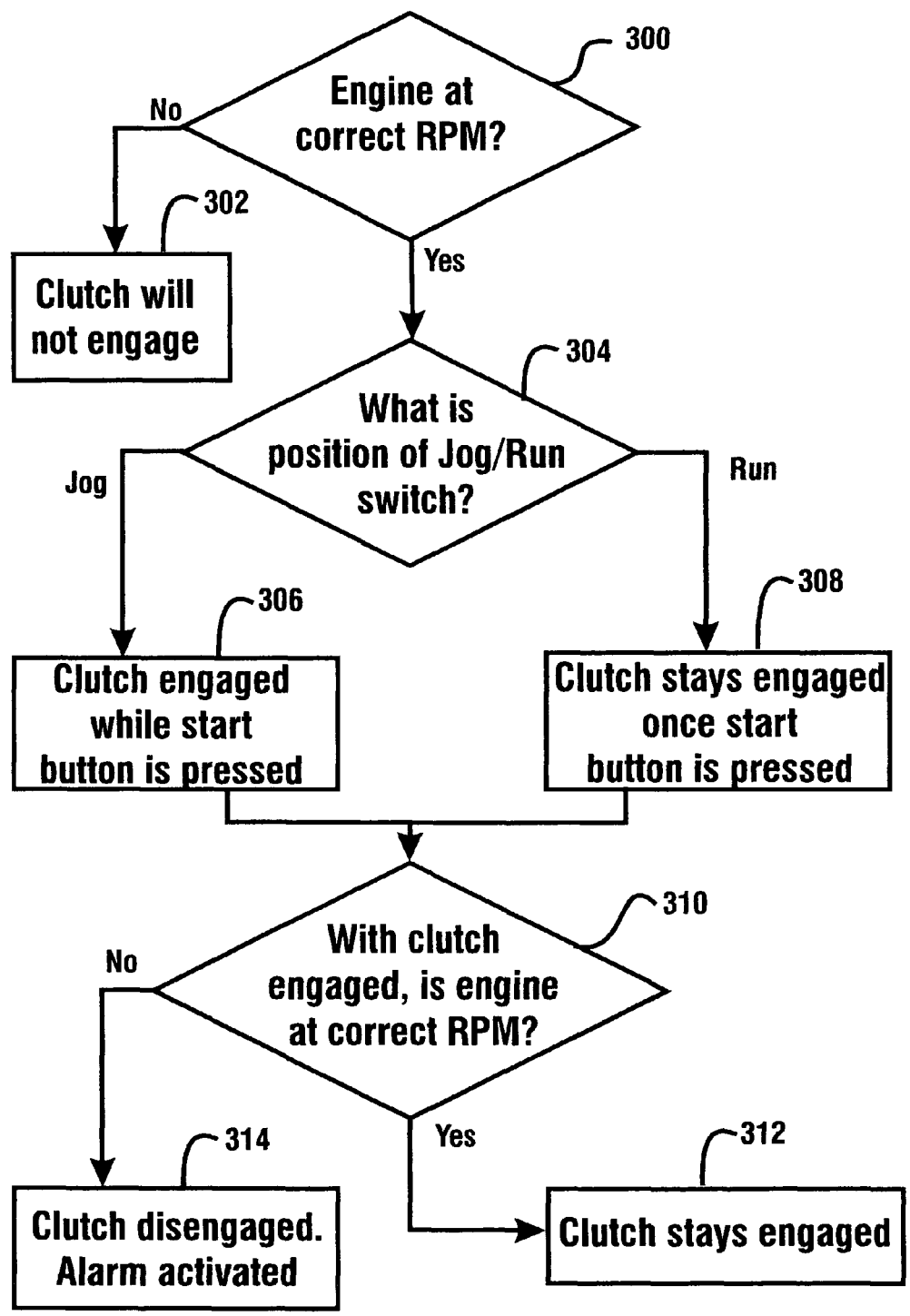
FIG. 20 shows a clutch control monitoring process.

The liner can be a unitary member (e.g., a boot ring) that includes plural moldable items therein, such as plastic balls. The liner can be cut to ensure proper fitting. The unitary member can be handled as a single unit. Alternatively, the liner may be applied non unitarily. For example, the liner may be sprayed or coated onto the gear teeth (or the friction discs)

as a plurality of separate substances or as a fluid. Later, the substances or fluid may harden to form a single anti-vibration unit. FIG. 16 shows a moldable annular liner 280. The liner 280 can be positioned adjacent to teeth prior to a gear ring and friction disc engagement. FIG. 17 shows a liner 281 located over the teeth 284 of a friction disc 282. FIG. 18 shows a liner 285 located inside of a drive gear ring 286, adjacent the drive gear teeth 288. Engagement between a gear ring 286 and a friction disc 282 allows a liner to be compressed and evenly dispersed between the engaging teeth 284, 288. An annular liner may be placed into position as a ring. Alternatively, one or more strips of liner may be cut from a roll of liner. During liner installation, the liner can conform to the shape of gaps between (gear ring or friction disc) teeth. The teeth can be used to initially hold the liner in position until engagement occurs between the gear ring and friction disc. In other installation arrangements the liner may include a self-adhesive backing. A self-adhesive backing may be used that temporarily adheres a liner strip adjacent to the teeth. The self-adhesive backing may be covered with peel-off paper. The adhesive feature of the backing can be time and/or heat sensitive. For example, after a predetermined time or temperature, the backing loses its ability to connect the liner to the teeth. The adhesive feature allows ample time for installation of the gear ring and friction disc. After assembly of the gear ring and friction disc the engaged teeth hold the liner in position, and the adhesive feature is no longer needed. The exemplary clutches described herein can each be used in an exemplary clutch control process with regard to machine operation. Diagnostic monitoring can be used in conjunction with an exemplary clutch to prevent stalling of an engine and/or damage to machine components. The monitoring arrangement includes a controller having one or more sensor devices in operative connection with at least one microprocessor. The controller can also be in operative connection with a jog/run switch, a start button, and a stop button.—21—FIG. 19 shows an area of a machine control panel 290 that includes a jog/run switch 292, a start button 294, and a stop button 296. The stop button 296 can be used by the machine operator to disengage the clutch and/or stop the drive engine. A lever 298 on the jog/run switch 292 can be positioned (e.g., rotated while depressed) to dictate the operational mode of the clutch. Alternative forms of jog/run switches may be used, including a two-way flip switch. FIG. 20 shows a flow chart of steps involving an exemplary clutch control sequence.

At startup, at least one sensor can be used to measure engine speed. If the controller determines that the engine speed is at or above a predetermined RPM, then the clutch can be engaged.

Otherwise, the clutch will not engage. Box 302 represents that the clutch cannot be placed in engagement as a result of the "No" determination at decision 300. The RPM setting can be adjusted.

The microprocessor can use at least one sensor to determine 304 the position of the jog/run switch. Depending on the position of the jog/run switch, the operational mode of the clutch will be either the jog mode or the run mode. In jog mode the clutch is only engaged while the start button is being manually pressed. Box 306 represents the clutch being engaged in jog mode. In run mode the clutch becomes engaged and stays engaged after the start button is manually pressed at least once 308. Box 308 represents the clutch being engaged in run mode. The microprocessor can use at least one sensor to determine whether the clutch is engaged. While the clutch is engaged, the diagnostics can again check 310 the engine RPM. If the engine speed is acceptable, then clutch engagement is maintained. Box 312 represents that clutch engagement is continued as a result of the "Yes" determination at decision 310. Otherwise, the clutch is disengaged. Box 314 represents that clutch engagement is discontinued—22—as a result of the "No" determination at decision 310. The microprocessor can cause an alarm to be activated responsive to the condition. The alarm may be visual and/or audible. For example, a warning light may be tripped to begin flashing. While the clutch remains engaged during machine operation, the engine RPM can be repeatedly checked 310. An RPM check can occur after a predetermined time period. The time period can be adjusted. The rechecking can be used by the microprocessor to respond to the shaft being bogged down. Such an event would cause the clutch to be automatically disengaged and the alarm to be tripped. The automatic disengagement can prevent damage to the machine. An operator may then shut down the machine. In alternative monitoring arrangements, while the clutch remains engaged during machine operation, the rotational speed of the shaft can be repeatedly checked instead of (or in combination with) the engine RPM. Thus, the exemplary monitoring arrangement can prevent engine stall. Likewise, damage to the machine and the clutch can be prevented. The clutch monitoring arrangement also enables monitoring in both jog condition and run condition.

An exemplary PTO clutch assembly can be factory or field retrofitted to replace a new or existing Twin Disc® Bell Housing style PTO clutch. The exemplary PTO clutch assembly permits ready replacement. In a retrofit operation, the mechanical linkage components associated with an existing clutch assembly arrangement can be removed and replaced by the exemplary PTO clutch assembly. Certain removed components of the existing Bell Housing style PTO clutch arrangement may be reused, such as the Bell Housing, drive shaft, shaft nut/washer, friction discs, and splined flywheel ring.

Additionally, replacement part kits can contain one or more components of an exemplary PTO clutch assembly. In an exemplary part replacement operation (e.g., changing a friction disc) the assembly can be disassembled to the extent necessary to permit replacement of the particular part(s). The shaft nut can be removed. Removal of the friction plate permits access to the friction disc(s) and springs for removal without disturbing the other assembled clutch components arranged on the shaft. Thus, the friction discs and springs can be readily and efficiently accessed and replaced. Other fastening screws can be removed, permitting other components to be accessed and removed/replaced. Alternatively, the entire clutch assembly can first be removed as a unit from the drive shaft and Bell Housing for later selective disassembly.

Exemplary embodiments of the novel clutch assembly apparatus have a self-adjusting disc pack to minimize slippage. Furthermore, mechanical linkages, hand levers, and yokes can be eliminated. The clutch assembly allows for remote actuation. The clutch can be air or fluid actuated to enhance applications requiring cold start. The quick release arrangement of the clutch assembly with respect to a drive shaft enables fast engagement thereto and disengagement therefrom. Thus, replacement of a clutch assembly component (or the entire assembly) can be carried out in a more efficient manner. Additionally, the novel clutch assembly arrangement enables existing clutch assemblies (or parts of the novel clutch assembly) to be replaced in the field to reduce down time. The novel clutch assembly can also be used to provide a benefit in both pressure and torque capacity over existing mechanical PTO units.

It should be understood that an exemplary embodiment of the novel clutch assembly is a self adjusting clutch. No mechanical adjustment is needed. The piston assembly can be axially driven to automatically compensate for any wear in a friction disc.

Exemplary embodiments of the novel clutch assembly apparatus can be used to retrofit a plurality of PTO clutches, including model types SAE 2, SAE 3, SAB 4, and SAE 5. Particular examples of clutch models that can be replaced by a respective exemplary clutch assembly include (but are not limited to) Single Disc 890-0058-SAE 3PTO, Twin Disc® 890-005 9-SAE 3PTO, and Twin Disc® Mechanical PTO Clutch #SP 111 and SP2 11. The novel clutch assembly apparatus allows retrofit with existing Bell Housings. An exemplary clutch assembly can be used with chipper devices or grinder devices. An exemplary clutch assembly can be used with devices requiring high torque operation during the (cutting) disposal of material (e.g., wood or metal).

An exemplary arrangement involving friction discs and separator disc will now be discussed. In the arrangement, each friction disc has a configuration that reduces the need for an initial break-in and burnishing thereof.

Conventionally, break-in and burnishing of new friction discs are normally required in order to reduce high spots (e.g., burrs) in the friction material. After conventional friction discs are initially installed, the presence of their high spots prevents full face contact with separator discs from being achieved. Thus, the ability of the friction discs to transmit full torque is not initially present. Only after the conventional friction discs have been broken in and lapped together against the separator discs do the high spots become generally worn down, enabling full face contact to finally occur between the friction discs and the separator discs.

It was found that high spots near the center of a friction disc are more problematic because they are harder to wear down. Because of their location, high spots closer to the disc center reduce disc contact further radially outward. Thus, inner high spots cause friction disc transmitted force to be reduced.

It was discovered that more initial torque transmission capability for a friction disc could be achieved (without any need for break-in) by removing approximately ten thousandths of an inch (10 micro-inches; 0.010 inches) of friction material in a direction radially outward to approximately one half of the disc diameter. Thus, when the exemplary friction disc is installed, the disc contact is necessarily only radially outward (and away) from the ten thousandths undercut (or recess or depression or grooved area). As a result, disc contact is more solid (or complete) away from the center of the clutch shaft, which results in more torque being initially transmitted.

Any high spots in the radially outward area (i.e., the higher area located radially outside of the undercut) are more quickly worn down by the lapping action (e.g., abrasion) of the friction disc against a separator disc. Eventually this outward area is worn down to the level where the inner recessed area also makes contact with the separator disc. This eventual wear, which leads to contact by the recessed area, further contributes to the overall torque transmission capability. However, because this eventual wear contact is provided in a smaller area (relative to the size of the outward area) and is closer to the axis of rotation, the amount of its overall torque contribution is less. Thus, the initial reduction in the amount of friction material in contact with the separator disc due to the undercut does not reduce initial transmission force. Rather, as an unexpected result, the undercut actually increases initial transmission force.

For reasons previously discussed, the main diameter of friction disc contact is increased by the addition of the recess feature. By definition of the torque formula used for friction style clutches, this in turn cause an increase in the torque capacity of the clutch device.

FIG. 21 shows a front view of an exemplary friction disc 320. The friction disc 320 has (in a direction extending radially outward) a center opening 322, a recessed inner area 324, and a relatively higher outer area 326. The recessed area 324 has an inner diameter (ID) and an outer diameter (OD) Each side of the disc comprises a recessed inner area 324 and an outer area 326. The disc also includes teeth 328. Also shown is a major diameter (M).

FIG. 22 shows a side view of the exemplary friction disc 320 taken along an outer edge.

Prior to its modification, the friction disc can be of the organic, Kevlar®, carbon fiber, non-asbestos, molded type that is commercially sold by Scan Pac Manufacturing. Friction discs can be used which have a variety of sizes, including those having thicknesses of 0.50, 0.625, and 0.75 inches. Friction discs can also be used which have a variety of different sized and amount of circumferential teeth.

The modification includes providing a recess in approximately the inner half of each side of the friction disc. Each side recess extends radially outwardly (from the opening) a distance that is approximately 35-50% of the total radial distance of the solid disc material. An exemplary recessed radial area is formed by having approximately 0.010 inch depth of friction material removed within the tolerance range of approximately plus-minus (±) 0.004 to 0.008 inches. Thus, the exemplary recess should have a surface that is about 0.010 inches lower than the surface of the radially outer (uncut) section. A recess can be formed by using processes such as cutting, machining, grinding, honing, abrading, etc., or may be molded into the disc profile.

An exemplary friction disc has external involute spline data comprising: type of fit=Fellows; number of teeth=59; diametral pitch=4/5; pressure angle=20; base diameter (ref) =13.8605; pitch diameter (ref)=14.750; major diameter=15.105 inches; minor diameter=14.235/14.221 inches; circular tooth thickness=0.3876 (max actual) and 0.3824 (min actual); measurement over pins=15.340 (min) and 15.327 (max); and pin diameter=0.4320 inches. The material comprises PMA MIX no. 090204. The inside diameter of the recessed area is approximately 7.00 inches. The tolerances are angular: mach±2'; with a bend (in inches) of ±0.030 (one place decimal), ±0.010 (two place decimal), and ±0.005 (three place decimal). Remove all burrs and break all sharp edges 0.15×45". The machined friction disc weight is approximately 5.5 lbs.

In the exemplary friction discs and separator discs relationship, the separator discs are also modified. Each separator disc can comprise a metal (e.g., steel or iron) plate that is machined to provide a surface having a coarse micro finish. For example, the separator discs can be provided with a coarse micro finish in the range of 240-280 Ra micro-inch. In an exemplary separator disc, each side has a finish in the range of 250-270 Ra micro-inch. This additional coarseness provides greater initial friction and grab (with adjacent friction discs) which facilitates immediate force transmission. This structural modification to the separator discs further eliminates the need for break-in and burnishing of the discs.

For reasons previously discussed, the coarse surface of the separator discs will accelerate the burnishing effort of the mating friction discs. This exemplary coarseness feature will also provide a temporary improvement in coefficient of friction between the mating surfaces (of the friction and separator discs), and thus will increase the torque capability of the clutch device until burnishing is achieved (and completed).

The exemplary arrangement of friction discs and separator discs can be used in many applications. The arrangement can be used in a dry application. For example, use with general transmission of force from an automotive or mobile flywheel which involves an SAE, ISO, or DIN type of mount. The exemplary friction discs and separator discs relationship can be used in a Bell Housing clutch.

A further exemplary embodiment includes a microprocessor-controlled proportioning valve that can be integrated with a clutch, such as a Bell Housing clutch. The proportioning valve can be used to increase pressure applied by the clutch piston to the friction discs from 100 to 200 psi over approximately 4-5 seconds. A parabolic curve force application applies the increasing pressure so that there is some period of disc slip. However, disc slip decreases with increasing pressure up to the point of solid disc engagement. As opposed to conventional bumping techniques, use of the microprocessor-controlled proportioning valve provides less risk of fracturing the friction discs.

An exemplary embodiment is directed to an apparatus, which comprises a dry application clutch friction disc. The friction disc comprises a radially extending material area and a radially extending open area. The open area is absent friction disc material yet comprises a center axis extending transversely through the open area. The friction disc is rotatable about the axis.

The radially extending material area comprises a high strength material, such as a para-aramid synthetic fiber (e.g., Kevlar® material). The material area comprises an inner circumferential surface and a toothed outer circumferential area, where the inner circumferential surface bounds the open area. The toothed outer circumferential area comprises fifty-nine teeth. In between the inner circumferential surface and the outer circumferential area, the material area has a non uniform thickness. The material area comprises opposite sides of the friction disc. Each disc side comprises a surface area extending radially outward from the inner circumferential surface to the toothed outer circumferential area. Each surface area comprises an inner planar surface region and an outer planar surface region. The inner planar surface region comprises an annular area extending radially outward from the inner circumferential surface to an intermediate radial position located approximately half way between the inner circumferential surface and the toothed outer circumferential area. The outer planar surface region comprises an annular area extending radially outward from the intermediate radial position to the toothed outer circumferential area. The inner planar surface region is recessed relative to the outer planar surface region in an inwardly axial direction a distance of approximately ten thousandths of an inch. An exemplary recess comprises a machined recess.

A further exemplary embodiment includes a dry application clutch comprising a friction disc. The friction disc comprises an annular radially extending material area which extends radially intermediate of an outer circumferential area and an open area. This material area includes disc material which comprises a side surface of friction material. The side surface comprises an inner annular side surface portion and an outer annular side surface portion. The inner annular side surface portion is disposed intermediate of the outer annular side surface portion and the open area. The inner annular side surface portion has an inner generally planar surface. The outer annular side surface portion has a generally planar surface which extends generally transversely outward beyond the inner generally planar surface of the inner annular side surface portion. The generally planar surface extends radially from the inner annular side surface portion to at least the outer circumferential area.

The friction disc has transversely opposed disc sides. The outer annular side surface portion of each side comprises a generally planar surface extending generally transversely outward beyond the respective inner annular side surface portion. The outer annular side surface portions have an approximate thickness of one of 0.500, 0.625, and 0.750 inches. The inner annular side surface portion extends radially outward from the open area to the outer annular side surface portion. The inner annular side surface portion is a recess in the friction material. The recess comprises a recess machined from the friction material, and extends generally transversely inward approximately ten thousandths of an inch relative to the outer annular side surface portion.

An exemplary material area has a maximum radial length comprising a first length. The recess has a maximum radial length comprising a second length. The second length is approximately half the length of the first length. The exemplary friction material comprises non asbestos, carbon fiber material, such as Kevlar®.

The further exemplary embodiment also includes at least one article including computer executable burnishing instructions (e.g., software) operative to cause a microprocessor to control a proportioning valve to allow pressure applied by a clutch piston to the friction disc to increase from approximately 100 psi to approximately 200 psi over a period of approximately 4 to 5 seconds. Examples of an exemplary article include a hard drive, memory stick, programmable semiconductor memory, magnetic memory, optical memory, and a memory storage device. An exemplary article can comprise a non-transitory computer readable medium including computer executable instructions operative to cause at least one computer to carry out the valve control.

The further exemplary embodiment additionally includes a separator disc having a size enabling operational engagement with the friction disc in a bell housing flywheel clutch arrangement. The separator disc comprises a central open area which is absent separator disc material. The separator disc also comprises an outer circumference. The separator disc also comprises an annular separator material area of substantially uniform thickness radially extending from a toothed inner circumferential area to the outer circumference. In initial clutch operation, the annular separator material area is only engageable with the generally planar surface of the outer annular side surface portion. The separator disc comprises an iron separator disc, wherein the annular separator material area comprises a machine-generated coarse surface having a micro finish in the range of 250-270 Ra micro-inch.

Another exemplary embodiment comprises an apparatus which includes a dry application bell housing flywheel clutch arrangement. The arrangement comprises at least one friction disc, at least one separator disc, and a piston. Each respective separator disc is located adjacent to a respective friction disc. The piston is operative to cause operational engagement between respective friction discs and separator discs. Each friction disc comprises fifty-nine disc teeth and has a maximum thickness of one of approximately 0.500, 0.625, and 0.750 inches. Each friction disc also comprises transversely opposed sides.

Each side comprises an annular radially extending outer material area. Each outer material area is radially outwardly bound by a disc teeth area. Each outer material area also comprises a first planar outer side surface that maximumly extends radially a first length. Each side also comprises an annular radially extending machined recess area.

Each recess area comprises friction disc material. Each recess area is also radially inwardly bound by an open area that is absent friction disc material. On each side, the recess area is radially outwardly bound by the outer material area. Each recess area further comprises a second planar outer side surface. On each side, the second planar outer side surface is positioned/located transversely inward from the first planar outer side surface a distance of approximately ten thousandths of an inch. The second planar outer side surface maximumly extends radially a second length which approximately equals the first length.

An exemplary clutch arrangement is operationally useful in different environments. For example, in a marine environment the engine may be tilted relative to the horizontal for purposes of being oriented with the angle of a drive shaft for a propeller. In another environment an engine may be tilted nose-down in order to produce a space saving configuration. The exemplary clutch can be used in both of these types of environments. Specifically, the exemplary clutch permits usage thereof in environments where the drive shaft is not in a horizontal position during operation. Thus, the exemplary clutch can be mounted on the front of an engine or a gear box in an orientation in which the drive shaft is not horizontal.

Figure 23:
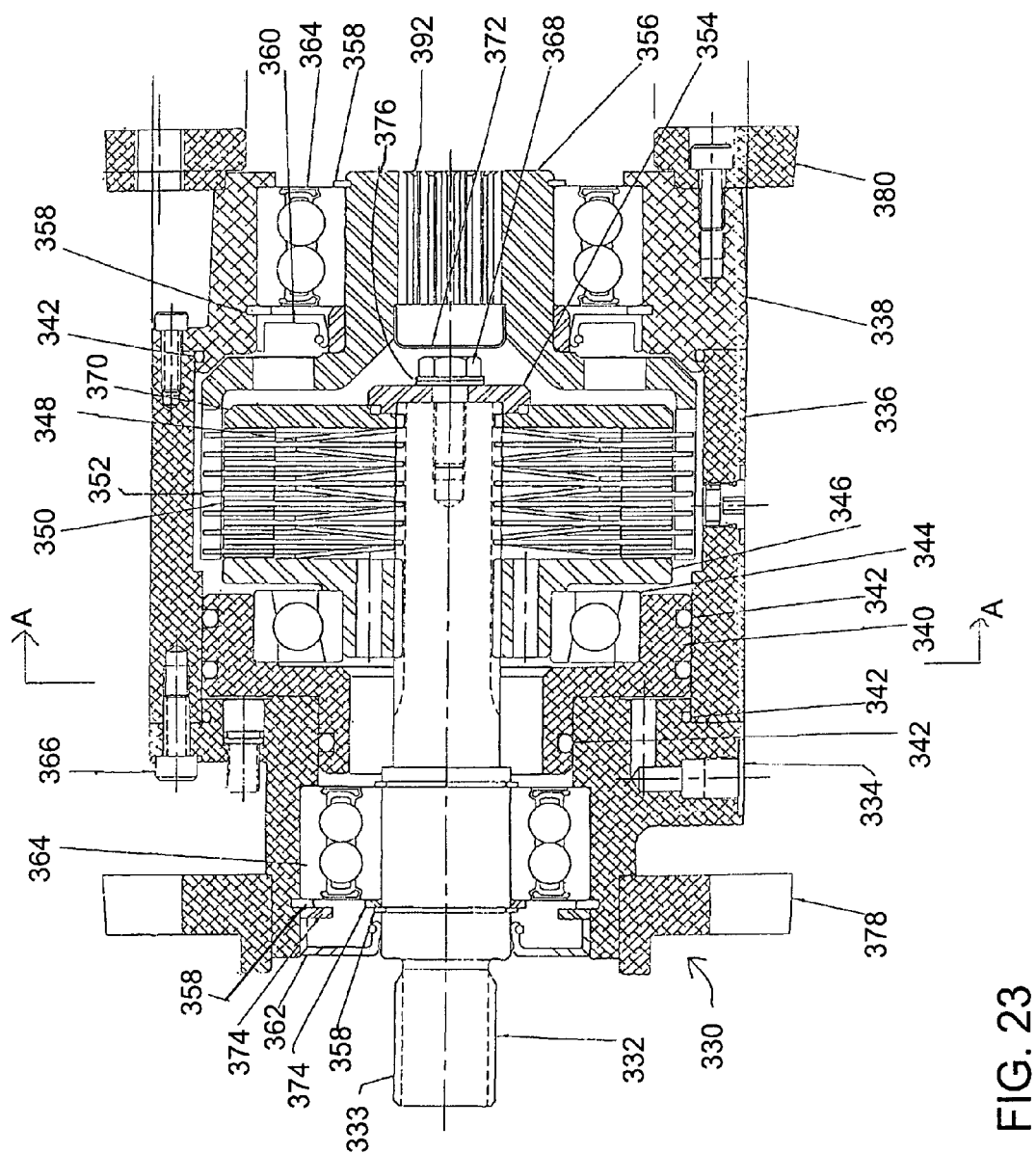
FIG. 23 shows an exemplary embodiment of a PTO clutch assembly arrangement.
Figure 24:
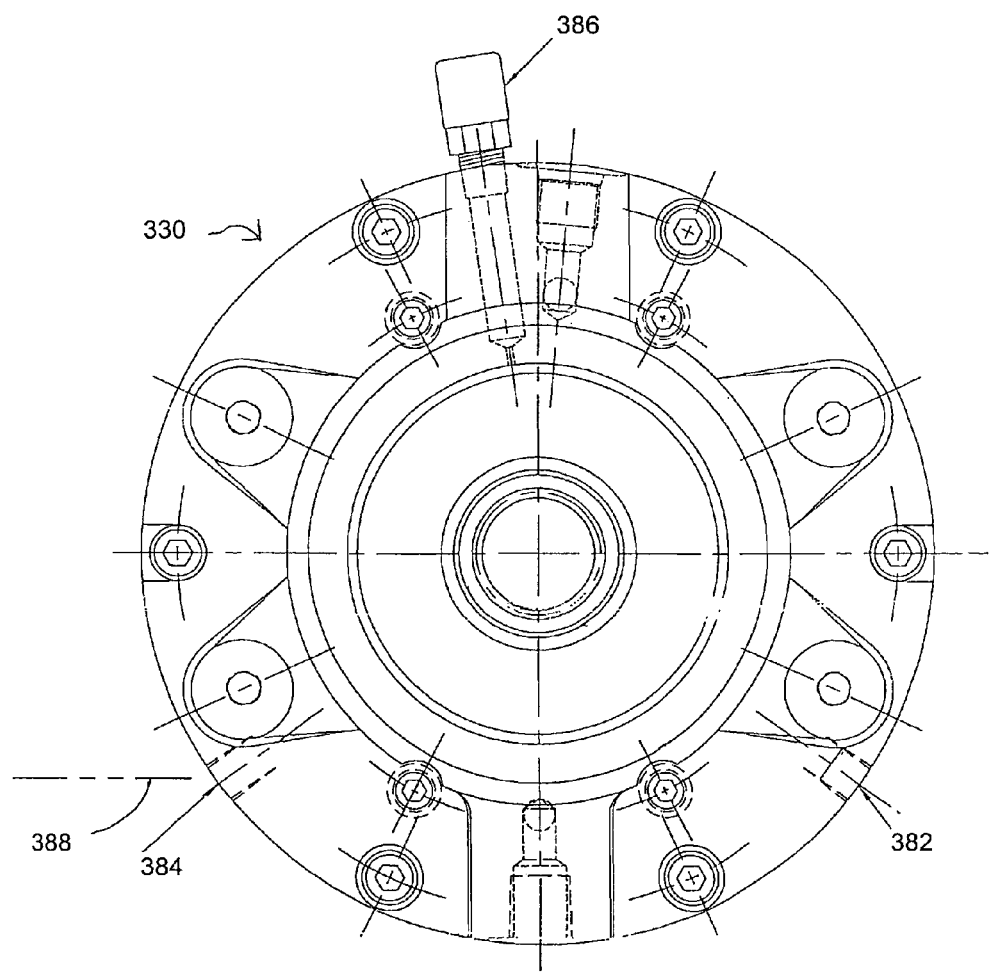
FIG. 24 shows a cross-sectional view taken along section A-A of FIG. 23.

FIGS. 23 and 24 show an exemplary embodiment of a PTO clutch assembly arrangement 330. FIG. 23 is a cross-sectional view of the clutch assembly 330. FIG. 24 is a cross-sectional view taken along section A-A of FIG. 23.

FIG. 23 shows the clutch assembly 330 comprising an input shaft 332 with splines 333, input housing 334, housing 336, output housing 338, piston 340, 0-rings 342, angular contact ball bearing arrangement 344, pressure plate 346, belleville springs 348, separator discs 350, friction discs 352, washer 354, drive cup 356, retaining rings 358, seals 360, 362, ball bearings 364, mechanical piston 366, hex head 368, backplate 370, freeze plug 372, support washers 374, lock washer 376, male flange 378, female flange 380, and drive cup output spline 392. FIG. 24 additionally shows plugs 382 for closing holes 384, a breather vent 386, and an oil lubrication (full) level line 388.

The shaft transition area between the toothed shaft input area 388 and the body of the shaft 332 includes a notch or neck 390. The configuration of the neck 390 has a smooth parabolic curved shape. This smooth configuration contributes to reduced shear in the shaft transition area.

The seal 360 is adjacent to the spline drive side of the drive shaft 332. The seal 360 comprises a double lip seal which prevents fluid flow both into and out of the body of the clutch. For example, the seal 360 prevents inward fluid flow when external positive pressure is acting on the face of the seal. Such situations may occur when the clutch is attached to the front of an engine, gear box, or similar device. Likewise, when the clutch is in a downward-facing orientation there may be a situation where air pressure is acting externally on the seal. The dual lip seal 360 seals against infiltration and oil leakage. The dual lip seal 360 prevents fluid (e.g., oil) from entering the clutch body and washing out the bearings 364 to cause bearing heat failure. The dual lip seal 360 also prevents fluid from filling the housing 336, which could cause bearing failure due to excess heat. In an exemplary embodiment the double lip seal 360 is a Viton seal which can successfully operate at a temperature of approximately 400° F.

The angular contact ball bearings 344 can operate to hold the pressure from the piston 340 against the disc pack 350, 352 when the clutch is engaged. In the exemplary embodiment, the clutch housing 336 is considered full of lubricant when the lubricant fills about only about a third of the housing capacity. At the full level the internal lubricant comprises about 4 oz of an automatic transmission fluid, such as Dexron III or Dexron VI. Alternatively, Shell Tellus 68 hydraulic oil may be used.

The overfill holes 384 in the housing 336 are configured to prevent overfilling of the lubricant. The holes 384 are normally closed by the plugs 382. By having one or more of the plugs 382 removed at the time of adding new lubricant to the housing, any excess lubricant is caused by gravity to flow out of the open hole(s). As a result of any excess lubricant having been automatically removed, the remaining lubricant in the housing is automatically properly set at the full level line 388. Of course any removed plug 382 is reinstalled before clutch operation.

An unexpected result of having a lesser amount (e.g., one third of capacity) of lubricant in the clutch housing 336 is enhanced cooling of the angular contact ball bearings 344. Apparently, the additional empty area in the housing (caused by the limited amount of lubricant used) allows for greater splashing and/or dispersion of the lubricant. This additional splashing and dispersion ability enables the lubricant to quickly transfer its heat directly to metal housing sections that are located far away from the bearings. That is, as opposed to the entire capacity being completely filled with lubricant, the splashing and dispersion onto remote (cooler) surfaces enables heated lubricant to more quickly find an available heat sink that can absorb excess heat (from the lubricant). The result is a faster and/or greater amount of heat transfer from the bearings.

Figure 25:
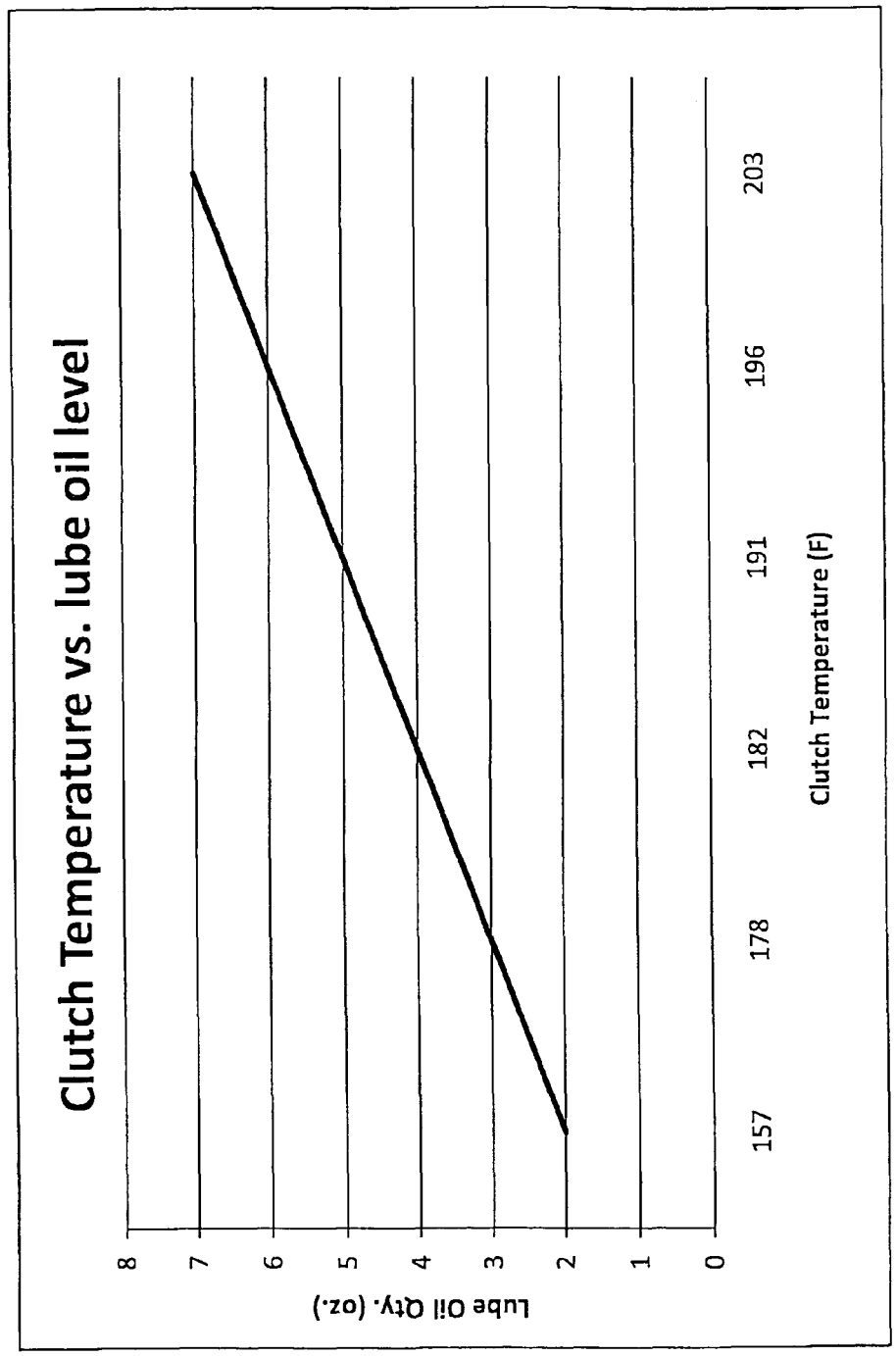
FIG. 25 comprises a graph showing the relationship between lubricant level and clutch surface temperature.

FIG. 25 comprises a chart which graphically shows the benefit of using only a limited amount of lubricant. Specifically, the chart shows lubricant level versus clutch surface temperature for a Logan Clutch model 500 clutch. Temperatures for lubrication fluid quantities from 2-7 oz were measured. The clutch parameters include the clutch being in a horizontal position, 110 psi air supplied, 2500 clutch rpm, and Dexron VI ATF used as the lubricant.

A lock arrangement 400 holds the clutch backplate 370 in position. The lock arrangement 400 includes the heavy end washer 354. The annular washer 354 has an annular projection 394 that can sit/rest in and engage an annular recess 396 in the backplate 370. As can be seen in FIG. 23, the projection 394 is disposed radially inward from the outer circumferential edge 398 of the end washer 354.

The end washer 354 is tightly held in position against the backplate 370 by a bolt/screw 402 (having the hex head 368) and the intermediate locking washer 376. The locking washer 376 is configured to grippingly engage and rotate the heavy end washer 354 relative to the backplate 370 as the hex head 368 (or nut) is being turned in the tightening direction. This rotation enables a more complete tightening of the bolt/screw 402. The locking washer 376 comprises a pair of pieces 404, 406. Each piece has a threaded face which can respectively engage the other threaded face to form a cam engagement lock. The locking washer 376 is configured so that prior to complete tightening, it can apply greater frictional engagement to the end washer 354 than the end washer 354 can apply to the backplate 370. That is, before tightening is completed the friction force created between the end washer 354 and the locking washer 376 can be greater than the friction force created between the end washer 354 and the backplate 370. Thus, rotation of the end washer 354 relative to (and sliding against) the backplate 370 can occur.

In contrast, even if an end washer in a conventional clutch structure was able to engage the backplate, this same end washer could not rotate relative to the backplate during tightening As a result, the conventional clutch backplate lock arrangement (in comparison to the exemplary lock arrangement) would prevent a bolt from being fully tightened.

As discussed above, one advantage of the end washer 354 and locking washer 376 relationship is that the backplate 370 can be more fully and securely fastened. A further advantage is that the clutch can be reversed (e.g., operate the drive shaft in a reverse direction) with less risk that the bolt/screw 402 will loosen. This is because relative to the (non slip) end washer/locking washer relationship, the end washer/backplate relationship provides for the surface of the end washer's projection 394 to slip relative to the surface of the backplate's recess 396. As a result of this end washer/backplate slippage relationship, the force that can be applied toward loosening the bolt/screw 402 is limited.

The freeze plug 372 is mounted to provide an inner seal at the output spline 392. The freeze plug 372 prevents material from entering in and from leaking out of the clutch housing 336. The o-ring seals 342 also prevent leakage from the housing 336.

In an exemplary embodiment the shaft 332 is hardened using an ion nitride process. This hardening helps prevent nicking (or denting, notching, grooving, chipping) of the shaft splines, especially in the area of the piston 340, backplate 370, separator discs 350, and friction discs 352. Such nicking in this area often occurs in conventional clutch structure due to heavy vibration associated with marine diesel engines. Thus, the hardened spline area of the exemplary shaft enables the piston 340 and the discs 350, 352 to more readily move axially. The shaft 332 also includes a nitrite coating which causes the shaft's outer surface to be more slippery, which further prevents nicking.

As previously discussed, the exemplary clutch is usable in PTO applications. The exemplary clutch can also be used in applications to run (operate) hydraulic pumps and in applications to run air compressors.

An exemplary embodiment is directed to an apparatus, which comprises a PTO clutch assembly arrangement. The arrangement comprises an input end housing section, an output end housing section, an intermediate housing section, a rotatable shaft, a rotatable drive cup, an annular piston, and a lock arrangement.

Input twin ball bearings and a double lip seal are located in the input end housing section. Output twin ball bearings and a one-way seal are located in the output end housing section. Both the double lip seal and the one-way seal are operable up to approximately 400 degrees Fahrenheit.

At least a part of the intermediate housing section extends intermediate the input end housing section and the output end housing section. The intermediate housing section is configured to hold lubrication fluid. Angular contact ball bearings are located in the intermediate housing section. A disc pack, a pressure plate, and a backplate are also located in the intermediate housing section. The backplate includes an annular recess. The disc pack is located intermediate the pressure plate and the backplate. The disc pack includes a plurality of rotatable separator discs, a plurality of rotatable friction discs, and at least one biasing member. In an exemplary embodiment, the at least one biasing member includes a plurality of springs, such as belleville springs.

The intermediate housing section includes at least one lubrication fluid overfill outlet and at least one plug configured to respectively close the at least one lubrication fluid overfill outlet. With the at least one plug removed during lubrication fluid adding, excess lubrication fluid is caused to escape by gravity through the at least one lubrication fluid overfill outlet resulting in a predetermined full level of lubrication fluid in the intermediate housing section. The intermediate housing section comprises a total internal volume. At the predetermined full level, approximately one third (30-36%) of the total internal volume includes lubrication fluid. In an exemplary embodiment, the intermediate housing section includes three lubrication fluid overfill outlets and three respective plugs.

The shaft includes a shaft input end, a shaft output end, and an axis. The shaft axially extends inside both the input end housing section and the intermediate housing section. The shaft is rotationally guided by input twin ball bearings. The shaft engages the double lip seal at two axially spaced positions. The shaft is rotationally guided by the angular contact ball bearings. The shaft is connected to the separator discs. The shaft comprises a propeller drive shaft which is specifically structurally configured toward marine environment usage. For example, the shaft comprises an ion nitride-hardened rotatable shaft which is angularly operable in the range of 7 to 10 degrees from horizontal. The PTO clutch arrangement is manually operable to engage and disengage PTO from the shaft.

The drive cup is connected to the friction discs. The drive cup is rotationally guided by the output twin ball bearings. The drive cup engages the one-way seal enabling the one-way seal to assist in preventing lubrication fluid leakage. The drive cup includes a toothed bore. The drive cup also includes a seal plug at one end of the toothed bore. In an exemplary embodiment, the seal plug is located at the inner end of the toothed bore.

The piston is at least partly located in the intermediate housing section. The piston is movable in an axial direction (e.g., movable in a direction of the shaft axis). Activation of the piston is operative to cause the piston to move to cause the shaft to impart rotation to the drive cup through engagement between the friction discs and the separator discs. That is, activation of the piston is operative to cause engagement of separator discs with respective friction discs to impart rotation to the drive cup. The belleville springs are operative to provide a force in an axial direction acting against this engagement.

The lock arrangement is operative to hold the shaft output end and the backplate in operative engagement, such as by fastening the shaft output end to the backplate. The lock arrangement includes a threaded fastener, an end washer, and a locking washer.

The threaded fastener includes a rotatable screw (or a bolt) having a fastener head. The screw (and head) is rotatable relative to the shaft during tightening of the screw (or bolt).

The end washer includes an axially extending annular projection configured to rest in the annular recess. The annular projection is also configured to engage the backplate while in the annular recess.

The locking washer is located axially intermediate the fastener head and the end washer. The locking washer operationally engages the end washer causing the end washer to rotate with rotation of the locking washer. Thus, rotational tightening of the fastener head causes the locking washer to engagingly rotate the end washer relative to the backplate. As a result, rotational tightening of the fastener head causes the annular projection in the annular recess to rotate into locking engagement with the backplate. This locking engagement enables operational usage of the shaft in both a first rotational direction and a second rotational direction, where the second rotational direction is opposite the first rotational direction.

In an exemplary embodiment of a clutch, the clutch has a maximum HP of 228 HP, maximum torque of 500 ft/lbs, min/max actuation pressure of 90/120 psi (7-78 bar), maximum operating speed of 2400 rpm, and maximum back pressure to tank of 5 psi. Inertial values are 0.24 lb-ft$^2$ disengaged and 0.56 lb-ft$^2$ engaged. The unit weight of the clutch is approximately 45 lbs (20.4 kg). The locking washer 376 comprises a Nord locking washer. Internal lubrication comprises 4 oz of Dexron III ATF, Dexron VI ATF, or Shell Tellus 68 hydraulic oil. With the total amount of lubricant filling only about a third of the housing capacity, an operational clutch surface temperature of no higher than 180° F. can be achieved. The input shaft 332 can comprise a SAE spline 'C' 14 tooth 12/24 DP input shaft. The toothed inner bore 392 of the drive cup 356 can comprise a SAE spline 'C' 14 tooth 12/24 DP output bore. When mounted, the clutch drive shaft can be successfully operated at approximately 7 degrees of axial tilt (or bend) in any direction.

Thus, the novel clutch assembly apparatus of the exemplary embodiments achieves at least one of the above stated objectives, eliminates difficulties encountered in the use of prior devices and systems, solves problems, and attains the desirable results described herein.

In the foregoing description, certain terms have been used for brevity, clarity, and understanding. However, no unnecessary limitations are to be implied therefrom because such terms are for descriptive purposes and are intended to be broadly construed. Moreover, the descriptions and illustrations herein are by way of examples and the invention is not limited to the details shown and described.

In the following claims, any feature described as a means for performing a function shall be construed as encompassing any means capable of performing the recited function, and shall not be limited to the particular means used for performing the function in the foregoing description, or mere equivalents.

Having described the features, discoveries and principles of the invention, the manner in which it is constructed and operated and the advantages and useful results attained, the new and useful structures, devices, elements, arrangements, parts, combinations, systems, equipment, operations, methods, processes, and relationships are set forth in the appended claims.

We claim:

1. Apparatus comprising:
    a dry application clutch friction disc,
        wherein the friction disc comprises a toothed outer circumferential area,
        wherein the outer circumferential area comprises disc material,
        wherein the friction disc comprises a central circular open area,
            wherein the open area is absent disc material,
                wherein a center axis extends transversely through the open area,
                    wherein in operation the friction disc is rotatable about the axis,
        wherein the friction disc comprises an annular radially extending material area,
            wherein the material area extends radially intermediate of the outer circumferential area and the open area,
            wherein the material area comprises disc material,
                wherein the disc material of the material area comprises friction material,
            wherein the material area comprises a side surface,
                wherein the side surface comprises an inner annular side surface portion and an outer annular side surface portion,
                    wherein the inner annular side surface portion is disposed intermediate of the outer annular side surface portion and the open area,
                    wherein the outer annular side surface portion comprises a generally planar surface,
                    wherein the generally planar surface extends generally transversely outward beyond the inner annular side surface portion,
    a separator disc having a size enabling operational engagement with the friction disc in a bell housing flywheel clutch arrangement,
        wherein the separator disc comprises a central open area,
            wherein the central open area is absent separator disc material,
                wherein the separator disc comprises an iron separator disc,
        wherein the separator disc comprises an outer circumference,
        wherein the separator disc comprises an annular separator material area of substantially uniform thickness radially extending from an inner circumferential area to the outer circumference,
            wherein the annular separator material area comprises a machine-generated coarse surface having a 250-270 micro finish,
            wherein in initial clutch operation the annular separator material area is only engageable with the generally planar surface.

2. The apparatus according to claim 1
    wherein the friction disc comprises transversely opposed disc sides,
        wherein each disc side comprises an inner annular side surface portion and an outer annular side surface portion which comprises a generally planar surface extending generally transversely outward beyond the inner annular side surface portion.

3. The apparatus according to claim 1 wherein the inner annular side surface portion is a recess in the friction material.

4. The apparatus according to claim 3 wherein the recess extends generally transversely inward approximately ten thousandths of an inch relative to the outer annular side surface portion.

5. The apparatus according to claim 3 wherein the material area has a maximum radial length comprising a first length, wherein the recess has a maximum radial length comprising a second length, wherein the second length is approximately half the length of the first length.

6. The apparatus according to claim 1 wherein the friction material comprises non asbestos, carbon fiber material.

7. The apparatus according to claim 1
    wherein the friction disc has a maximum thickness of one of approximately 0.500, 0.625, or 0.750 inches,
    wherein the friction disc comprises fifty-nine disc teeth,
    wherein the second planar outer side surface is positioned transversely inward from the first planar outer side surface a distance of approximately ten thousandths of an inch.

8. Apparatus comprising:
    a dry application clutch friction disc,
        wherein the friction disc comprises a toothed outer circumferential area,
        wherein the friction disc comprises a central circular open area,
            wherein the open area is absent disc material,
                wherein a center axis extends transversely through the open area, wherein the friction disc comprises an annular radially extending material area,
    wherein the material area extends radially intermediate of the outer circumferential area and the open area,
    wherein the material area comprises disc material,
        wherein the disc material of the material area comprises friction material,
            wherein the friction material comprises non asbestos, carbon fiber material,
        wherein the material area comprises a side surface,
            wherein the side surface comprises an inner annular side surface portion and an outer annular side surface portion,
                wherein the inner annular side surface portion is disposed intermediate of the outer annular side surface portion and the open area,
                wherein the outer annular side surface portion comprises a generally planar surface,
                    wherein the generally planar surface extends generally transversely outward beyond the inner annular side surface portion,
a separator disc,
    wherein the separator disc comprises a size enabling operational engagement with the friction disc,
    wherein the separator disc comprises a central open area,
        wherein the central open area is absent separator disc material,
    wherein the separator disc comprises an outer circumference,
    wherein the separator disc comprises an annular separator material area of substantially uniform thickness,
        wherein the annular separator material area radially extends from an inner circumferential area to the outer circumference,
        wherein the annular separator material area comprises a metal material,
        wherein the annular separator material area comprises a coarse surface having a 240-280 micro finish,
        wherein in initial clutch operation the annular separator material area is only engageable with the generally planar surface.

9. The apparatus according to claim 8 and further comprising a disc pack,
    wherein the disc pack includes a plurality of first discs, a plurality of second discs, and at least one biasing member,
        wherein the first discs and the second discs are rotatable about a common axis,
            wherein the first discs and the second discs are axially movable relative to the common axis,
        wherein the first discs and the second discs are alternatingly arranged with each first disc being located adjacent to at least one second disc and each second disc being located adjacent to at least one first disc,
            wherein each second disc is configured for operational engagement with the at least one first disc,
        wherein each first disc comprises a disc configuration corresponding to the friction disc,
        wherein each second disc comprises a disc configuration corresponding to the separator disc.

10. The apparatus according to claim 8 wherein the outer annular side surface portion extends approximately half the radially length of the side surface.

11. The apparatus according to claim 8 wherein the material area comprises opposite sides,
    wherein each side comprises an inner side portion and an outer annular side portion,
        wherein each inner side portion is disposed intermediate of each outer side portion and the open area,
        wherein each outer side portion comprises a generally planar surface,
            wherein the generally planar surface extends generally transversely outward beyond the inner side portion.

12. The apparatus according to claim 8 wherein the inner annular side surface portion comprises a generally planar inner surface,
    wherein the generally planar inner surface is positioned axially inward from the generally planar surface a distance of approximately ten thousandths of an inch.

13. Apparatus comprising:
a clutch friction disc,
    wherein the friction disc comprises a toothed outer circumferential area,
    wherein the friction disc comprises a central circular open area that is absent disc material,
        wherein a center axis extends axially through the open area,
    wherein the friction disc comprises a radially extending material area,
        wherein the material area extends radially intermediate of the outer circumferential area and the open area,
        wherein the material area includes a disc side surface of non metal friction material,
            wherein the disc side surface comprises a recessed portion and an outward portion,
                wherein the recessed portion comprises a generally planar recessed surface,
                wherein the recessed portion is disposed intermediate of the outward portion and the open area,
                wherein the outer portion comprises a generally planar outward surface,
                wherein the generally planar outward surface extends axially outwardly beyond the generally planar recessed surface,
a separator disc,
    wherein the separator disc is configured for operational engagement with the friction disc,
    wherein the separator disc comprises a central open area that is absent separator disc material,
    wherein the separator disc comprises an outer circumference,
    wherein the separator disc comprises a separator material area,
        wherein the separator material area extends radially intermediate of the outer circumference and the central open area,
        wherein the separator material area includes a separator side surface of metal material,
            wherein the separator side surface is coarse relative to the disc side surface,
            wherein in the operational engagement, the configuration causes the separator side surface to initially only be engaged with the generally planar outward surface.

14. The apparatus according to claim 13 and further comprising a disc pack,
    wherein the disc pack includes a plurality of first discs, a plurality of second discs, and at least one biasing member, wherein the first discs and the second discs are rotatable about a common axis, wherein the first discs and the second discs are axially movable relative to the common axis, wherein the first discs and the second discs are alternatingly arranged with each first disc being located adjacent to at least one second disc and each second disc being located adjacent to at least one first disc, wherein each second disc is configured for operational engagement with the at least one first disc, wherein each first disc comprises a disc configuration corresponding to the friction disc, wherein each second disc comprises a disc configuration corresponding to the separator disc.

15. The apparatus according to claim 13 wherein the non metal friction material comprises non asbestos, carbon fiber material, and wherein the outward portion extends approximately half the radially length of the disc side surface.

16. The apparatus according to claim 13 wherein the material area comprises opposite sides, wherein each side includes a disc side surface of non metal friction material, wherein each disc side surface comprises a recessed side portion and an outward side portion, wherein each recessed side portion comprises a generally planar recessed side surface, wherein each recessed side portion is disposed intermediate of the outward side portion and the open area, wherein each outer side portion comprises a generally planar outward side surface that extends axially outwardly beyond the generally planar recessed side surface.

17. The apparatus according to claim 13 wherein the recessed portion is positioned axially inward from the outward portion a distance of approximately ten thousandths of an inch.

18. The apparatus according to claim 13 wherein the separator side surface comprises a 240-280 micro finish.

19. The apparatus according to claim 13 wherein the separator material area comprises a substantially uniform thickness from the outer circumference to the central open area.

* * * * *